US006938637B2

(12) United States Patent
McGill et al.

(10) Patent No.: US 6,938,637 B2
(45) Date of Patent: Sep. 6, 2005

(54) EMERGENCY GAS AND ELECTRICITY SHUTOFF APPARATUS AND CONTROL SYSTEM

(76) Inventors: James C. McGill, 4312 Lisa Dr., Union City, CA (US) 94587; Douglas P. Arduini, 549 Jesse James Dr., San Jose, CA (US) 95123-4848

(*) Notice: Subject to any disclaimer, the term of this patent is extended or adjusted under 35 U.S.C. 154(b) by 0 days.

(21) Appl. No.: 10/730,050

(22) Filed: Dec. 9, 2003

(65) Prior Publication Data

US 2004/0149334 A1 Aug. 5, 2004

Related U.S. Application Data

(60) Division of application No. 09/449,484, filed on Nov. 29, 1999, now Pat. No. 6,705,340, which is a continuation-in-part of application No. 09/027,197, filed on Feb. 20, 1998, now Pat. No. 5,992,439, which is a continuation-in-part of application No. 08/965,014, filed on Nov. 5, 1997, now Pat. No. 6,085,772.

(51) Int. Cl.[7] .............................................. F16K 31/12
(52) U.S. Cl. ...................... 137/39; 137/38; 137/487.5; 137/624.11; 137/624.12
(58) Field of Search .................. 137/38, 39, 624.11, 137/624.12, 487.5

(56) References Cited

U.S. PATENT DOCUMENTS

| | | | |
|---|---|---|---|
| 613,990 A | 11/1898 | Guyenot | |
| 2,017,274 A | 10/1935 | Breitenstein | |
| 2,206,067 A | 7/1940 | Waltamath | |
| 2,215,044 A | 9/1940 | Kammerdiner | |
| 2,579,656 A | 12/1951 | Douglas et al. | |
| 2,637,331 A | 5/1953 | Sullivan | |
| 2,927,982 A | 3/1960 | Slough | |
| 3,044,741 A | 7/1962 | Grove | |
| 3,238,969 A | 3/1966 | Champion | |
| 3,245,257 A | 4/1966 | Anderson | |
| 3,256,735 A | 6/1966 | Smith | |
| 3,266,308 A | 8/1966 | Howarth | |
| 3,272,009 A | 9/1966 | Leopold, Jr. et al. | |
| 3,273,855 A | 9/1966 | Wells | |
| 3,296,859 A | 1/1967 | Stewart | |
| 3,747,616 A | 7/1973 | Lloyd | |
| 3,768,497 A | 10/1973 | Mueller | |
| 3,783,887 A | 1/1974 | Shoji | |
| 3,805,818 A | 4/1974 | Yamada | |
| 3,842,852 A | 10/1974 | Bair | |
| 3,878,858 A | 4/1975 | Yamada | |
| 3,946,754 A | 3/1976 | Cook | |
| 4,007,643 A | 2/1977 | Matsushita | |
| 4,028,510 A | 6/1977 | Yamaura et al. | |
| 4,098,284 A | 7/1978 | Yamada | |
| 4,165,758 A | 8/1979 | Douce | |
| 4,174,729 A | * 11/1979 | Roark et al. ............. | 137/487.5 |
| 4,185,507 A | 1/1980 | Domyan | |
| 4,207,912 A | 6/1980 | Ichikawa | |
| 4,212,313 A | 7/1980 | Winters | |

(Continued)

FOREIGN PATENT DOCUMENTS

JP          57-12172          1/1982

*Primary Examiner*—A. Michael Chambers
(74) *Attorney, Agent, or Firm*—Wenderoth, Lind & Ponack, L.L.P.

(57) ABSTRACT

A gas meter installation including gas supply plumbing and point of use plumbing will have a gas meter therebetween. A valve can be installed with the gas meter for shutting off the flow of gas to the point of use. This valve is preferably a gate valve mounted with the a gas meter, and can be retrofitted into existing installations, or installed with the new plumbing installation. The valve can be shut off by remote activation for example due to a seismic sensor causing a controller to send a signal to activate the valve. The control can also interact with electricity shut off apparatus, automatic meter reading apparatus and point of use security systems.

7 Claims, 23 Drawing Sheets

U.S. PATENT DOCUMENTS

| | | |
|---|---|---|
| 4,245,814 A | 1/1981 | Shimizu |
| 4,261,379 A | 4/1981 | Berry |
| 4,327,760 A | 5/1982 | Lancaster |
| 4,331,171 A | 5/1982 | Novi |
| 4,349,042 A | 9/1982 | Shimizu |
| 4,382,449 A | 5/1983 | Nelson |
| 4,475,565 A | 10/1984 | Keller et al. |
| 4,485,832 A | 12/1984 | Plemmons et al. |
| 4,603,591 A | 8/1986 | Sibley et al. |
| 4,640,303 A | 2/1987 | Greenberg |
| 4,688,592 A | 8/1987 | Tibbals, Jr. |
| 4,782,848 A | 11/1988 | Sibley et al. |
| 4,785,842 A | 11/1988 | Johnson, Jr. |
| 4,799,505 A | 1/1989 | Nowell |
| 4,817,657 A | 4/1989 | Kovacs |
| 4,844,113 A | 7/1989 | Jones |
| 4,903,720 A | 2/1990 | McGill |
| 4,920,999 A * | 5/1990 | Asbra et al. .................. 137/38 |
| 4,960,146 A | 10/1990 | Morris |
| 5,029,601 A | 7/1991 | Reschke et al. |
| 5,042,528 A | 8/1991 | England et al. |
| 5,050,629 A | 9/1991 | Willoughby |
| 5,052,429 A | 10/1991 | Yoo |
| 5,074,327 A | 12/1991 | Reid |
| 5,078,172 A | 1/1992 | Gonzalez |
| 5,115,829 A | 5/1992 | Franzke |
| 5,119,841 A | 6/1992 | McGill |
| 5,143,110 A | 9/1992 | Simpson |
| 5,148,829 A | 9/1992 | Deville |
| 5,209,454 A | 5/1993 | Engdahl et al. |
| 5,325,881 A | 7/1994 | Hunter et al. |
| 5,351,706 A | 10/1994 | Banks |
| 5,409,031 A | 4/1995 | McGill et al. |
| 5,437,300 A | 8/1995 | Winnie et al. |
| 5,584,465 A | 12/1996 | Ochsenreiter |
| 5,694,960 A * | 12/1997 | Turk et al. ..................... 137/1 |
| 5,794,667 A * | 8/1998 | Payne et al. ................. 141/128 |
| 5,960,807 A * | 10/1999 | Reyman ........................ 137/1 |
| 5,992,439 A | 11/1999 | McGill |
| 5,999,087 A * | 12/1999 | Gunton .................... 340/309.5 |
| 6,491,062 B1 * | 12/2002 | Croft ..................... 137/624.11 |

\* cited by examiner

EMERGENCY GAS AND ELECTRICITY SHUTOFF APPARATUS AND CONTROL SYSTEM

This is a Divisional Application of U.S. patent application Ser. No. 09/449,484, filed Nov. 29, 1999 now U.S. Pat. No. 6,705,340 which is a Continuation-In-Part of U.S. patent application Ser. No. 08/965,014 filed Nov. 5, 1997, now U.S. Pat. No. 6,085,772 and Ser. No. 09/027,197, filed Feb. 20, 1998, now U.S. Pat. No. 5,992,439.

BACKGROUND OF THE INVENTION

1. Field of the Invention

The present invention relates to emergency gas and electricity shutoff equipment and control systems therefor. In particular, the present invention relates to the shutoff of the flow of natural gas to a home or other point of use for reasons of safety during emergencies such as seismic events, fires, etc. The present invention further relates to apparatus and systems for shutting off the electricity at a home or other point of use under similar conditions.

2. State of the Prior Art

Various devices have been known in art for shutting off gas systems in the event of a seismic disturbance or the like. For example, U.S. Pat. No. 4,311,171 to Nobi requires a first ball to close a fuel line and at least a second ball, wherein the second ball is mounted within the casing so that a tremor would cause the second ball to dislodge the first ball from its pedestal. The ball for closing the fuel line is required to be mounted in a concave cup supported by a plurality of ball bearings, and includes a concave member as well as a resilient means such as a spring for biasing the cup against the concave member.

U.S. Pat. No. 4,565,208 to Ritchie requires the inclusion of a track and at least a ball riding in the track, and in addition requires the inclusion of "an obstruction" which causes the ball to leave the track when a seismic disturbance causes the ball to contact to the obstruction with sufficient energy. It further requires the obstruction to include an incline surface that extends over the track and has a height which decreases across the width of the track.

U.S. Pat. No. 4,475,565 to Keller et al. discloses a magnetically actuable shock responsive unit. This unit includes a valve mechanism for shutting off the flow in a fluid line and is operable upon shock induced horizontal displacement of a weight relative to a support to actuate the valve. An electromagnet is provided for providing a separate actuation of the weight. Movement of the weight from its support to the side of the housing causes the weight to engage a movable tube that releases a mechanism that closes the valve.

U.S. Pat. No. 4,903,720 to McGill, one inventor of the present invention, discloses a safety shutoff device usable in any position. An inertia ball engages a first member so as to move the first member from a first position to a second position in response to vibrations or shocks imparted to the housing.

U.S. Pat. No. 5,119,841 discloses another safety shutoff apparatus using an inertia ball that normally rests on an indented surface. A lever is pivotally mounted with a permanent magnet mounted beneath the free end of the lever. When a shock or vibration causes the inertia ball to jump onto the lever and roll toward its free end, the inertia ball is attracted to the permanent magnet so as to cause the lever to be pivoted downwardly.

Further seismic safety valves are described in U.S. Pat. Nos. 5,409,031, 4,903,720 and 5,119,841.

SUMMARY OF THE INVENTION

The objects of the present invention are to generally improve the state of the prior art with respect to emergency shutoff, not only of the flow of gas to a point of use installation, but also of the supply of electricity.

According to a first aspect of the present invention, a gas meter and valve installation has gas supply plumbing for supplying gas to a point of use and point of use plumbing receiving gas from the gas supply plumbing. A gas meter has a gas inlet connected to the gas supply plumbing and a gas outlet connected to the point of use plumbing for metering the quantity of gas used at the point of use so that a gas supply passage is established through the gas supply plumbing, the gas meter and the point of use plumbing. A gas flow shutoff valve is positioned along the gas supply passage outside of the gas meter and has a valve member that is movable between an open position in which the gas supply passage is open, allowing for gas to flow through the gas meter and into the point of use plumbing, and a closed position in which the gas supply passage is substantially closed so that substantially no gas is allowed to flow into the point of use plumbing.

The gas flow shutoff valve preferably has a housing having a valve gas inlet and a valve gas outlet. One of the inlet and the outlet is connected to the gas meter and the other is connected to one of the gas supply plumbing and the point of use plumbing. A spacer having a spacer inlet and outlet is connected between the other of the gas supply plumbing and the point of use plumbing.

Preferably, the point of use plumbing includes a service tee having an inlet, an outlet and a service opening having a plug therein.

The gas inlet and the gas outlet comprise male inlet and outlet threads. The point of use plumbing or the gas supply plumbing has a union nut for connection with one of the male inlet and outlet threads. The gas flow shutoff valve is connected between the other of the point of use plumbing and the gas supply plumbing and the other of the male inlet and the male outlet threads. The gas flow shutoff valve has a nut thereon for connection with the other of the male inlet and the male outlet threads and a total height that is equal to the height of the union nut.

According to a second aspect of the present invention, a gas flow control system includes a gas passage including gas supply plumbing and point of use plumbing for receiving gas from the gas supply plumbing. A gas flow shutoff valve is positioned between the gas supply plumbing and the point of use plumbing, and is capable of closing in response to a gas flow shutoff signal. A controller remote from the gas flow shutoff valve is capable of generating the gas flow shutoff signal, and a communication link between the controller and the gas flow shutoff valve sends the gas flow shutoff signal to the gas flow shutoff valve.

The controller may comprise a seismic sensor for generating the gas flow shutoff signal, and/or a security system control, and/or a break away gas pipe portion positioned between the gas flow shutoff valve and the point of use.

A fuel cell can be used to generate electric power from gas flowing through the gas passage. For example, the fuel cell could provide electricity for an automatic meter reading device connected with a gas meter. The automatic meter reading device may have a communication link with the controller to send signals thereto representing gas usage.

The gas flow control system can also have an electric interface device installed at an electric meter box in communication by a communication link with the controller.

According to a third aspect of the present invention, there is provided an improved valve for shutting off a flow of gas. In this valve a housing has a gas inlet, a gas outlet and a gas passage therebetween. A gate mounted in the housing is movable in a direction across the gas passage between open and closed positions. The gate has a first portion having an opening therein positioned across the gas passage in the open position and a second portion positioned across the gas passage in the closed position. An upstream seat is mounted in the housing upstream of the gate, the upstream seat surrounding the gas passage and contacting the gate so as to form a seal between the housing and the gate on the upstream side of the gate. A downstream seat is mounted in the housing downstream of the gate. The downstream seat surrounds the gas passage and contacts the gate so as to form a seal between the housing and the gate on the downstream side of the gate.

According to a fourth aspect of the present invention, a gate valve for shutting off a supply of gas is spring biased toward its closed position. A release pin is movable between one position in which the release pin prevents the spring from moving the gate toward the closed position and another position in which the release pin releases the spring and the gate so that the gate moves to the closed position under the biasing force of the spring.

A reset member is interconnected with a gate for resetting the gate from the closed position to the open position. The reset member extends from a point outside of the housing to the gate and has an end received in an elongate slot in the gate. The slot has a stop member and an end thereof so that when the gate is in the closed position, the reset member can be pulled from outside of the housing so that the end of the reset member engages the stop member and pulls the gate from the closed position. The reset member is sealed from the outside by a dynamic seal in the housing. It further has a knob thereon positioned outside of the housing for manipulating the reset member, the knob having a static seal thereon for engagement with the housing.

The housing has a chamber adjacent to the gas passage, the chamber having a gate end through which the gate is movable and a spring end. The spring is compressed between the spring end and the gate in the open position. The gate includes a spring receiver on an end thereof in the chamber and receiving the spring therein. The release pin, in the open position of the gate, extends into the chamber and engages the spring receiver.

The release pin is moveably supported by a bushing and has an engagement end for engaging a member fixed with respect to the gate, a shaft portion slidable in the bushing and a stop for engaging the bushing in order to limit movement of the release pin. A connector in the release pin has an axial space therein. An actuator is provided for actuating the release pin, and includes a link member that extends into the axial space and is movable therein. When the actuator is actuated to move the gate to the open position, the link member axially moves a predetermined distance without engaging the connector of the release pin before engaging the connector of the release pin. The actuator includes a solenoid and a solenoid pin having a link member connected thereto. The solenoid pin is spring biased toward the release pin.

A status indicator may be provided on the exterior of the housing to indicate the open or closed status of the gate.

The member on the gate and the release pin may have respective complimentary engagement surfaces angled with respect to the direction of movement of the gate in order to make it easier for the gate to be actuated.

The release pin may also comprise a roller for engagement with the member fixed with respect to the gate. Further, the release pin may comprise a solenoid pin movably supported in the solenoid actuator by a plurality of rollers mounted on the solenoid pin.

According to another aspect of the present invention, a valve for shutting off a flow of gas has a magnet mounted with a gate of the valve. A solenoid actuator is provided for moving the magnet so that the gate is moveable between the open and close positions.

According to yet another aspect of the present invention, an electricity shut-off arrangement includes an electric meter box mounting an electric meter, a circuit breaker on the electric meter box for shutting off electricity and a pull chain on the circuit breaker. A shutoff device is connected with the pull chain for actuating the circuit breaker by pulling the pull chain. This device has a communication link for communicating with a remote controller for activating the shut-off device. Preferably a door is provided so as to be able to close over the shut-off device.

The shut-off device may comprise a spring-loaded rotatable arm for pulling the pull chain. This arm has a detention portion thereon for engagement with a release member. The release member is movable between a detention position in which the release member engages the detention portion of a spring-loaded rotatable arm to detain the spring-loaded rotatable arm in a spring-loaded position and a release position in which the release member releases the detention portion so that the spring-loaded rotatable arm can rotate and pull the pull chain.

In one preferred embodiment, the release member comprises a ball member. The detention portion preferably comprises an angled surface on the spring-loaded rotatable arm that biases the ball member away from it. A release pin is moveably mounted between a first position that prevents the ball member from moving, and a second position in which the ball member can move away from the detention portion. A solenoid actuator is provided for moving the release pin. Preferably a solenoid pin of the solenoid actuator will move and accelerate over a predetermined distance before actually engaging and moving the release pin.

According to another preferred feature of this aspect of the invention, the release pin has a second ball member that is rollably positioned thereagainst at a position opposite to the first ball member.

Alternatively, the release member may comprise a solenoid pin that is spring-biased into engagement with the detention portion of the spring-loaded rotatable arm. The solenoid pin has a solenoid actuator for moving the pin against the spring-biased in order to release the spring-loaded rotatable arm.

According to a further aspect of the present invention, an electric interface device is provided for placement between an electric meter and a meter box. The device has a pair of interface plugs for connection to receptacles of the meter box, a pair of interface receptacles for connection to a pair of electric meter plugs and an electricity shut-off for shutting off electrical connection between one of the interface plugs and the respective one of the interface receptacles. The interface plugs and interface receptacles are ordinarily electrically connected to each other. The electricity shut-off preferably comprises a connector that connects one of the plugs with one of the receptacles of the interface, and a solenoid actuator for moving the connector to break the electrical connection. The interface further includes a housing having a first interface flange for connection with a meter box flange and a second interface flange for connection with a meter flange. The interface may further include a communication link linking the electricity shut-off with a remote controller and an external power connection for supplying power to outside of the interface device.

DETAILED DESCRIPTION OF THE PREFERRED EMBODIMENTS

In the following discussion, the same reference numbers indicate the same or similar features of the present invention in the various embodiments.

A first feature of the present invention is discussed with reference to FIGS. 1 and 2, and concerns an interface arrangement for adapting a gas flow valve to a gas meter. This concept is related to that set forth in co-Applicant's prior U.S. application Ser. No. 09/027,197, incorporated herein by reference. U.S. application Ser. No. 08/965,014 is also incorporated herein by reference.

Figure 1:
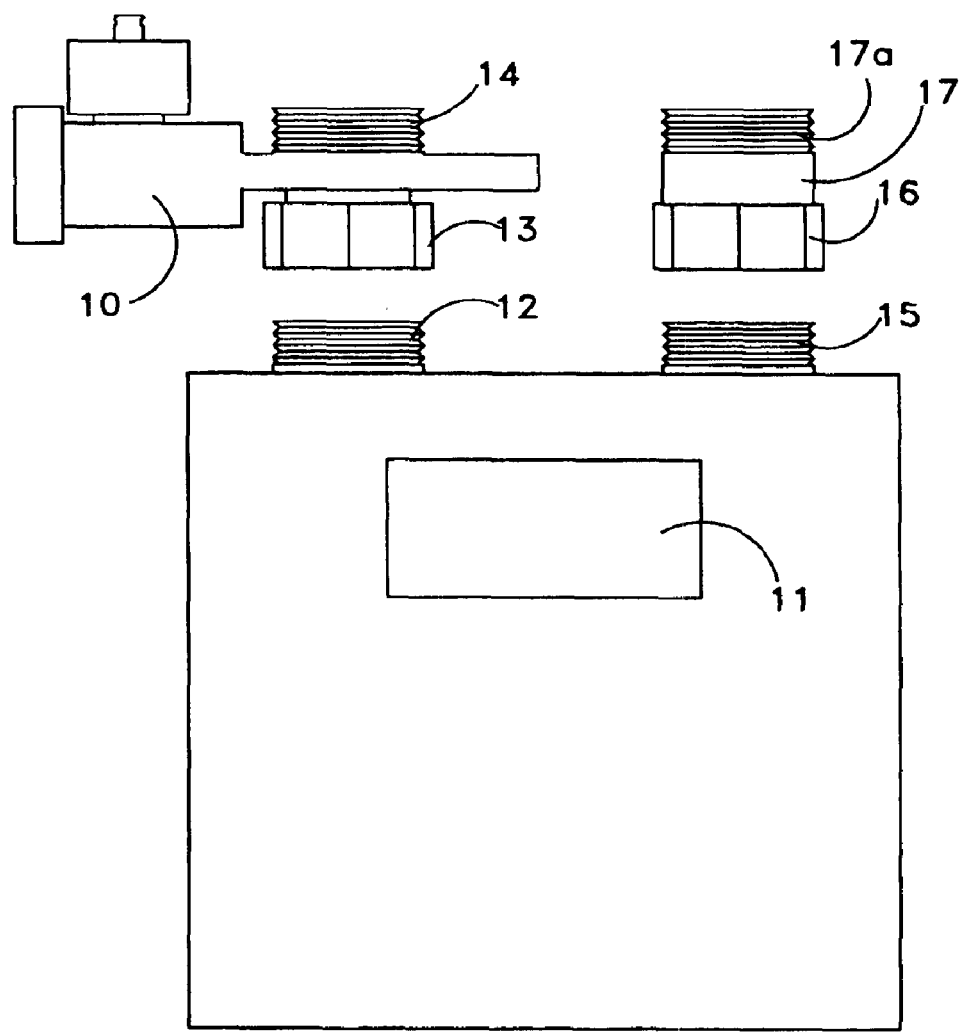
FIG. 1 is a schematic view of a gas meter and valve interface connection.

FIG. 1 schematically illustrates a valve 10 for shutting off gas flow. The valve has an external thread 14 that matches an inlet thread 12 of a standard gas meter 11 and a union nut 13 designed to be connected to the inlet thread 12 of the meter 11. A spacer 17 has an external thread 17a that matches an outlet thread 15 of the gas meter 11 and a union nut 16 attached to the spacer 17 that is designed to connect to the outlet thread 15 of the gas meter 11.

Figure 2:
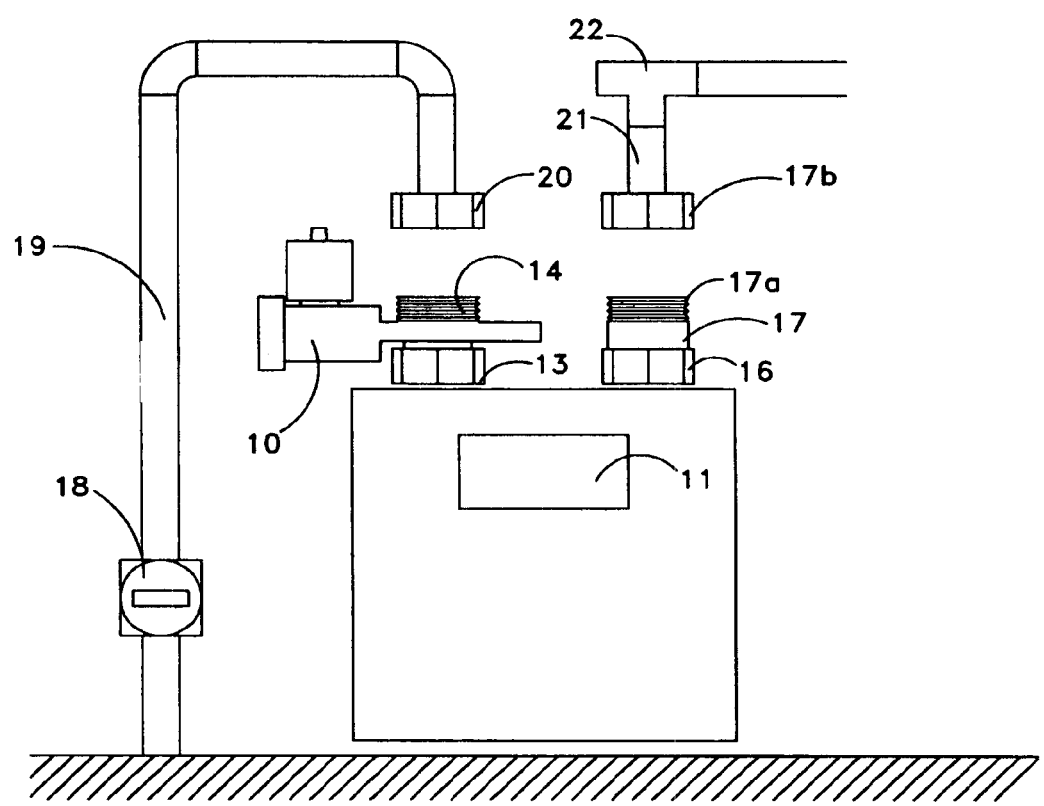
FIG. 2 is a view similar to FIG. 1, but showing the gas meter together with gas supply and gas point of use plumbing.

FIG. 2 shows these features connected together and in relation to gas supply plumbing and point of use plumbing. The valve 10 and spacer 17 are connected to the meter 11 with the union nuts 13 and 16 being screwed onto the external threads 12 and 15, respectively. When the valve 10 and the spacer 17 are installed on the gas meter 11, the distance from the gas meter 11 to the top of the thread 14, and the distance from the gas meter 11 to the top of the thread 17a, are the same.

The gas supply plumbing includes a shut-off valve 18, a gas supply pipe 19 and a union nut fitting 20. The point of use plumbing includes a union nut fitting 17b for connection to the external thread 17a, a pipe 21 and a standard service tee 22 connected to the pipe 21. The right-hand side of the service tee 22 connects to the point of use, such as a home or other point of use of the natural gas supply. The union nut fitting 20 is connected to the external thread 14 and union nut fitting 17b is connected to the external thread 17a. Note that the valve 10 and the spacer 17 could be exchanged so that the spacer is on the inlet side and the valve is connected to the outlet side of the gas meter 11.

With the arrangement according to FIGS. 1 and 2, a standard gas meter such as gas meter 11, having external threads 12 and 15 thereon, can be modified to incorporate a means of shutting off the flow of gas there through. By the term "standard gas meter" is meant those gas meters known in the industry that are in common use and have reached a level of standardization clear to those of skill in this art.

With the arrangement of FIGS. 1 and 2, any standard gas meter can be modified to incorporate a way shutting off the flow of gas without having to build a valve into the meter itself. This also consequently allows an easy way of maintaining the valve itself, separately from the meter, because they are separate components the valve can be operated or replaced without having to change the meter itself.

Figure 3:
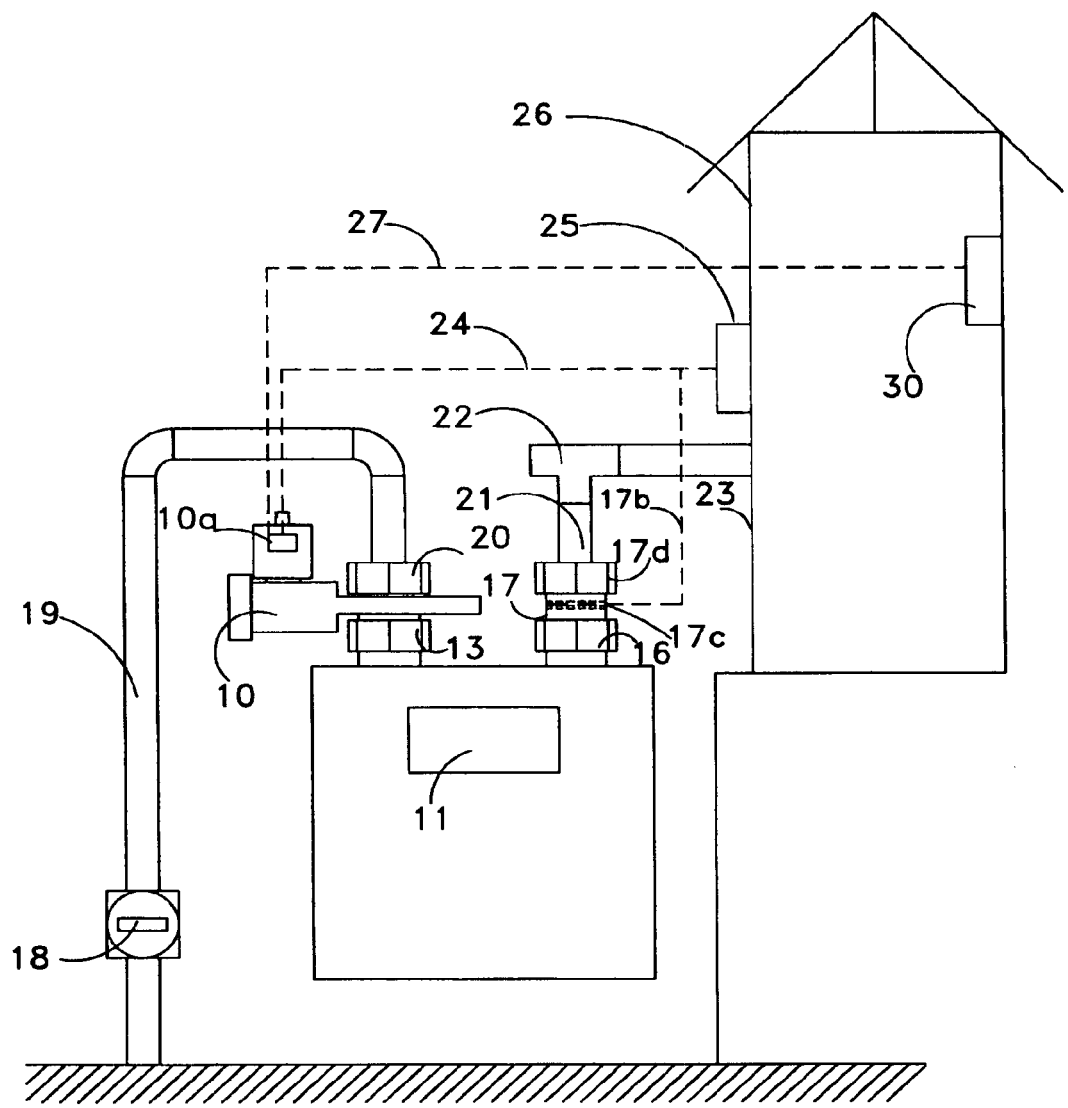
FIG. 3 is a view similar to FIG. 2 showing additional system components.

Turning now to FIG. 3, a modification of the arrangement of FIGS. 1 and 2 may be seen. A communication module 10 for communication by radio frequency (RF) or through a wire 24 can communicate with a controller module 25 and can be mounted at a remote location. In FIG. 3, the controller module 25 is shown as mounted to a structure 26 such as a home or other point of use. However, it can be mounted at any location suitable for communication with the communication module 10a.

Power for operating the valve 10 can be supplied from a source that is either located at the valve communication module 10a or at a remote location.

The control module 25 may include a seismic sensor designed to have a time delay that will activate the valve 10 after it receives a given acceleration over a specified period of time. A valve shut-off signal may then be sent from the controller module 25 through the wire 24 or by RF to the communication module 10a and thus to the valve 10 for activation thereof A security system 30 may be incorporated with the valve control system. For example, the power for operating the system could be supplied through a wire connection 27 from the security system control 30. The seismic sensor could also be located at the security system 30, rather than at the control module 25. In other words, the control module 25 could be replaced by a security system 30 in general, this security system 30 thus essentially incorporating the control module 25 for the valve activation system. Such a security system 30 could further activate the valve 10 after receiving a signal from other sensors, such as a CO sensor, a gas sensor, a smoke sensor, a fire alarm, sprinklers, a panic button, etc.

According to the further feature in FIG. 3, the spacer 17 includes a "break-a-way" feature 17c. This break-a-way feature is designed to be the weakest part of the gas system so that it will break before other areas of the pipe. The break-a-way feature 17c can be connected to the communication module 10a for providing a valve shut-off signal to the valve 10 for activation thereof.

One advantage of having the valve 10 activated by a remote sensor such as a control module 25, a security system 30 or a break-a-way feature 17c, is that the valve will then not be required by industry standards to be braced to the building or the ground, because the seismic sensor is not part of the valve itself.

Power for activating the valve 10 can be self-contained in the valve 10, or it can be supplied from a remote location such as the controller module 25 or the security system 30. Also, a capacitor could be located at the valve 10 for activation of the valve 10 with a fail-safe circuit.

The arrangement of FIG. 3 shows the valve 10 with the modified spacer 17 as part of an overall system. The system has several options in terms of communication with a controlled sensor. A sensor could be mounted on an outside wall of the structure such as structure 26, and it could also be mounted with a controller mounted inside of the structure. Communication between the sensor and the valve can be with a wire or through RF. This allows for the valve to be easily maintained and replaced, and allows for the valve to be replaced without having to break into the gas pipe. Maintenance, further, is independent of the gas meter, because the method of replacing the valve allows for use of a bypass tee 22. The bypass tee 22 allows for a quick change without having to stop the flow of gas to the structure 26. Thus a homeowner does not have to be at home for installation or service of the valve, and pilot lights inside of the structure 26 do not have to be relit.

The control module 25 will contain the seismic sensor, for example, designed to have a time delay to activate the valve after receiving a given acceleration lasting over a specified period of time.

Figure 3A:
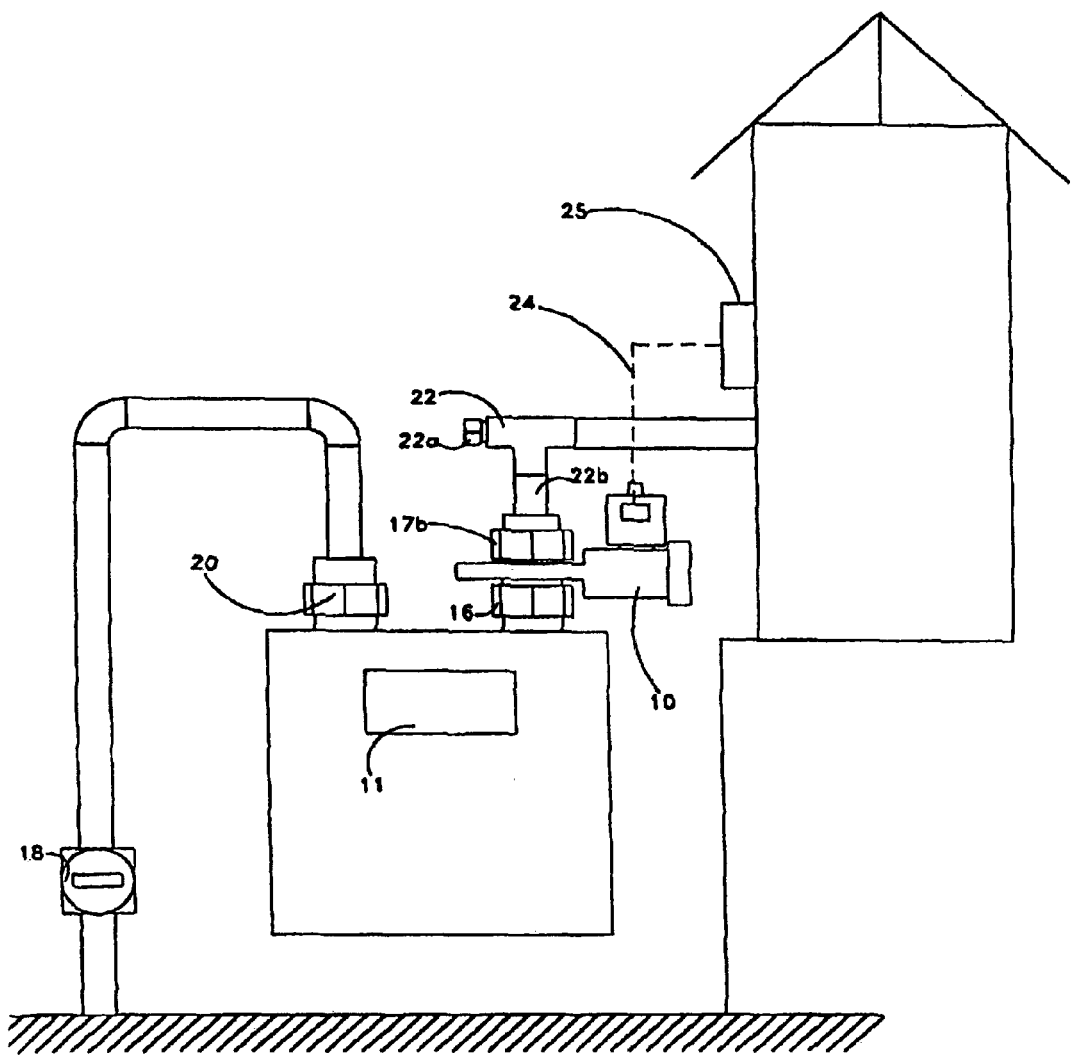
FIG. 3A is a view similar to FIG. 3 illustrating an alternative arrangement.

FIG. 3a shows another alternative arrangement according to the present invention. In this arrangement, the valve 10 is mounted on the outlet of the gas meter 11 without a spacer being installed at the inlet of the meter. This method of installation is useful for new installations. That is, where the valve does not need to be retrofitted onto an existing installation, a corresponding spacer may not need to be supplied for insertion of the valve 10 into the plumbing, because the installation of the plumbing itself can make up for the additional pipe provided by the spacer.

The service tee 22 here includes a pipe plug 22a and a connecting pipe 22b connecting to the valve 10. An advantage here is to provide an easy way of removing the valve for service. The service tee 22 can be used to supply gas to the structure 26 for installation, removal, replacement or maintenance of the valve 10. Such a method also allows for installation and maintenance without having to remove the gas meter 11 from an existing position, for example, connected at union nut 20.

When retrofitting a valve 10 to form an arrangement as shown in FIG. 3a, an existing installation may have a simple straight pipe from service tee 22 to the gas meter 11. A method of replacing this pipe with the valve 10 would then involve first removing the gas meter 11, or rotating it away from the pipe extending from the service tee. The union nut and the longer pipe 22b are then disconnected from the service tee 22, and a shorter pipe 22b is inserted between the service tee 22 and the union nut. The valve 10 is then mounted between a union nut 17b and the gas meter 11.

In a new installation, the valve 10 is installed by attaching the union nut 16 to the gas meter 11 and the union nut 17b to the valve 10 without having to remove any previously installed components. Methods of maintaining the valve correspond to performing the above steps in reverse.

Figure 3B:
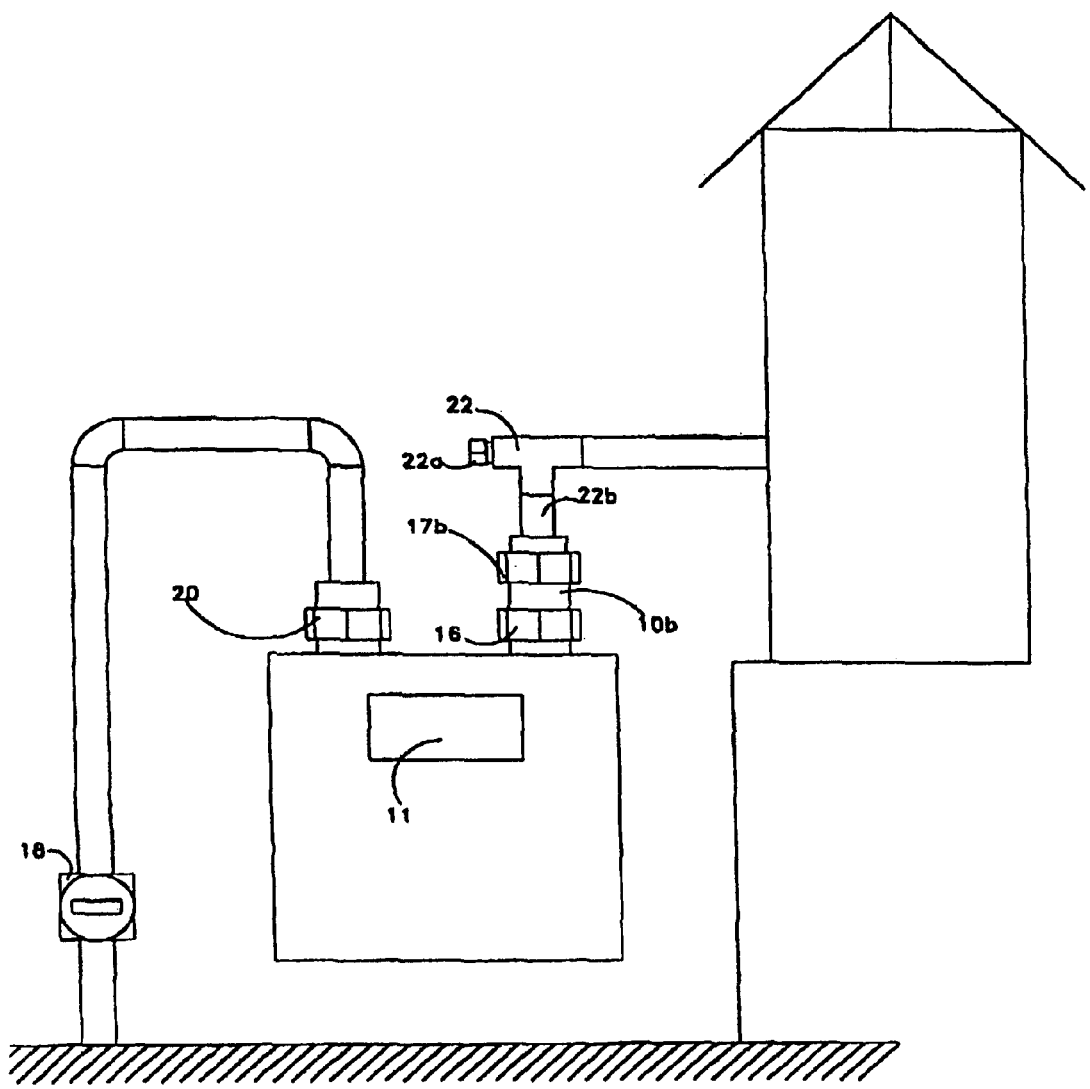
FIG. 3B illustrates yet another alternative arrangement according to the present invention.

FIG. 3b is similar to FIG. 3a, but simply shows a valve 10b instead of a valve 10 shown in FIG. 3a. It is noted that the valve 10 shown in FIG. 3a has been illustrated so far so as to correspond to a gate type valve to be described later. However, as demonstrated by FIG. 3B, the installation and maintenance methods according to the present invention can be performed with any type of valve.

Figure 4:
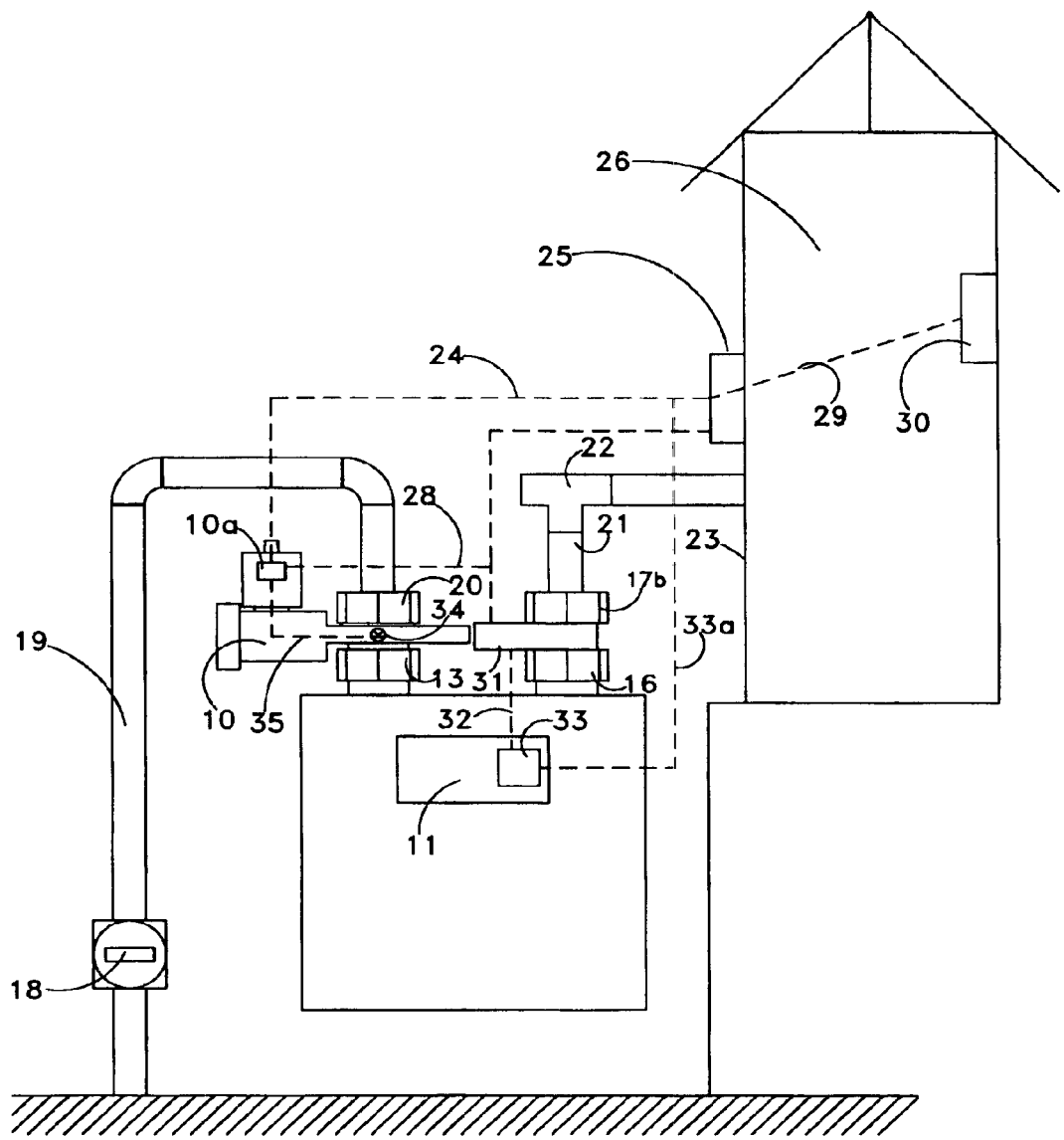
FIG. 4 is a view similar to FIG. 3 showing additional and alternative system components.

FIG. 4 shows an alternative and expanded arrangement of a shut-off valve system for the gas meter 11. The valve 10 communicates through the communication module 10a through wire 24 or by radio frequency with a control module 25. The control module 25 can also communicate with the security system controller 30 through wire 29 or by radio frequency. Electric power to operate the system, in this case, can be provided by a fuel cell 31 that is designed to replace the spacer 17 of FIG. 3. The fuel cell 31 generates its own electric power from gas flowing through the gas pipes 19. Electric power coming from the fuel cell 31 powers the valve 10 and the control module 25 through wires 28. It further can provide power to operate an automatic meter reading (AMR) device 33 through a wire 32.

The AMR device 33 communicates through a wire 33*a* or by radio frequency with the control module 25. The control module 25 can thus provide total gas usage over a given period of time, and can transmit this information to a remote location. The control module 25, furthermore, is designed and operated to compare the flow rate per unit of time (volume per unit time received from the AMR device 33) corresponding to before an earthquake is detected by its seismic sensor to that measured after the earthquake. If the flow rate increases after the earthquake, the control module 25 will assume that there is a gas leak in the system, and will activate the valve 10 to the off position.

The control module 25 can have input, or be designed and operate so as to "learn", the flow rate of appliances that have constant flow rates (i.e. appliances used, for example, in the structure 26 and connected to the point of use plumbing). Accordingly, the control module 25 can determine whether the flow rate after an earthquake has increased by an amount which corresponds to a constant flow rate of one of the appliances. The control module 25 will then assume that the appliance has been turned on, and assume that this does not represent a leak, so that a signal will not be sent to turn the valve 10 to the off position.

A further feature of the control module 25 is the ability to detect flow problems, such as excess flow rates, that exceed a predetermined set point.

A pressure sensor 34 may be incorporated as part of the valve 10. The pressure sensor 34 is designed to detect pressure in the gas system and to activate the valve 10 if the pressure becomes abnormal. The pressure information detected by the pressures sensor 34 is sent to the valve 10 and/or the control module 25 through a wire 35, through the communication module 10*a* and the wire 24 or the radio frequency to the control module 25.

The use of a fuel cell in the system of FIG. 4 allows for a more reliable source of power than a system that depends upon the use of batteries. The fuel cell, further, can be used to also operate the AMR device 33 and the various communication links used in the system.

In accordance with the invention of FIG. 4, the control module 25 forms a device which can employ the information from the AMR device 33, compare the flow rate per unit of time before an earthquake occurs with that after an earthquake, and make decisions as to whether or not to shut-off the flow of gas based upon this information. Specifically, the controller 25 is a device which determines that if a flow of gas exceeds a predetermined flow rate, the valve 10 will be shut-off.

A further advantage of the arrangement of FIG. 4 is the use of the pressure sensor 34. The pressure sensor 34 can activate the valve when pressure changes indicate an excess flow or an abnormal condition. Such excess flow or abnormal condition will be assumed to indicate a leak in the system and the valve will then be shut-off. An advantage of using the pressure sensor 34 is that the gas will be shut off when it is most likely that there is a gas leak, as opposed to simply shutting off the gas when the ground moves. In other words, the pressure sensor 34 can be used in conjunction with seismic sensors for more precise determination of whether there is a need to shut-off the gas, that is, whether there is a break in the system requiring such shut-off.

Figure 5:
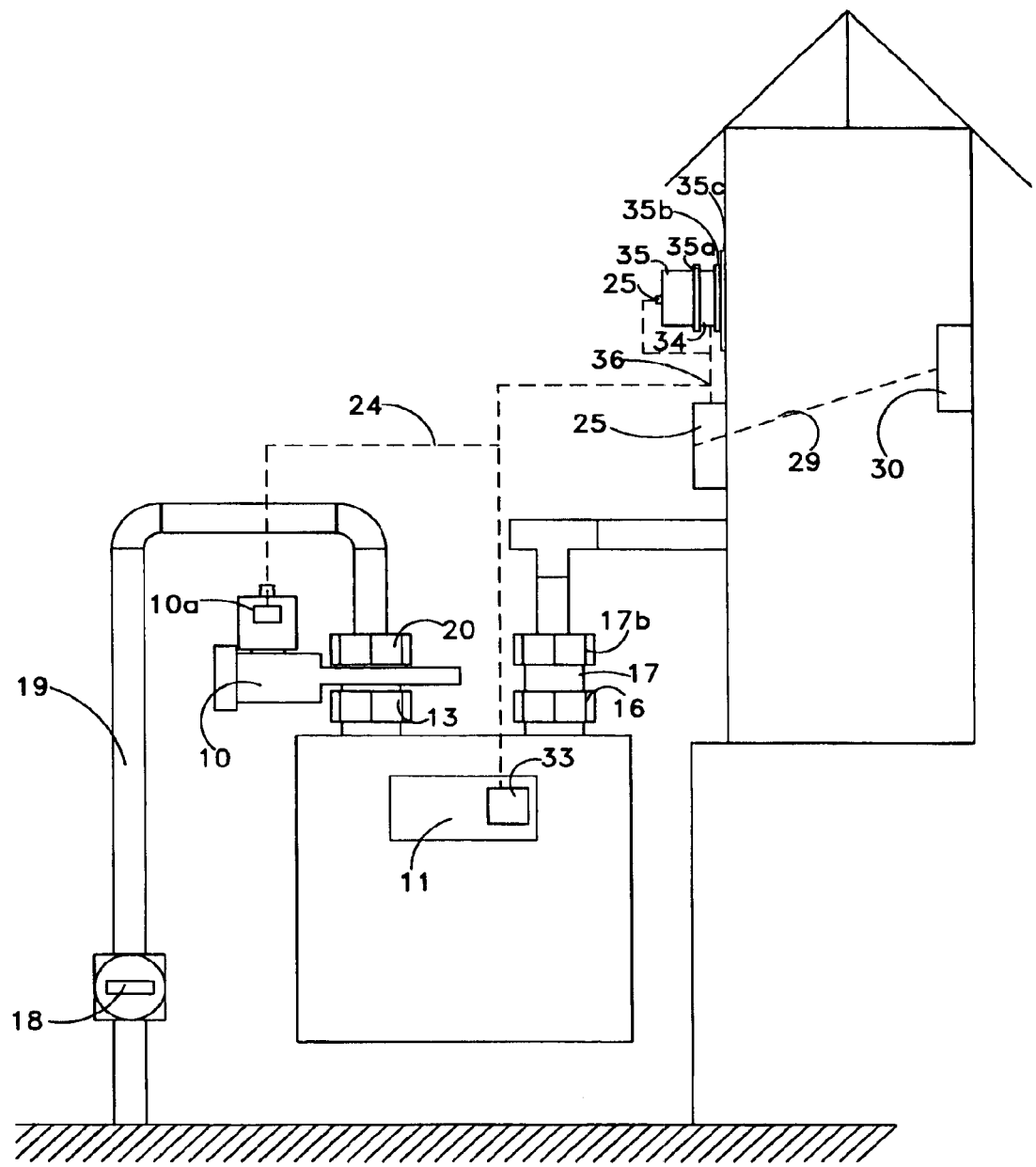
FIG. 5 is a view similar to FIG. 3 showing additional and alternative system components and arrangements.

FIG. 5 illustrates a further arrangement of the system in general accord with the system as discussed with respect to FIGS. 1–4. In this case, however, the system incorporates an electric interface device 34 (detailed below) installed at an electric meter box 35*c* and connected to the electric meter box 35*c* by a security band 35*b*. The interface device 34 receives and is connected to an electric meter 35 and is secured to the electric meter 35 by a security band 35*a*. Interface device 34 thus interfaces between the electric meter box 35*c* and the electric meter 35, where the electric meter 35 is ordinarily directly connected to the electric meter box 35*c*.

The interface device 34 includes a built in shut-off feature which can be activated by a signal from the control module 25 through a power/communication cable 36. Alternatively, a radio frequency communication link or a battery backup could be provided with the electric interface device 34 for outside communication.

The electric interface device 34 is designed to provide electrical power to operate the overall system illustrated in FIG. 5, including, but not limited to, the control module 25, the valve 10 and the AMR device 33. Power from the interface device 34 can be stepped down inside of the interface device 34 to a low voltage. As previously, the control module 25 can communicate with the security system 30 through a wire 29 or by radio frequency. Of course, the control module 25; can also have outside communication through any appropriate means.

Accordingly, the electric interface device 34 provides a power source for operation of the system. Advantageously, it can also incorporate a built in way of shutting off electricity. Details of an example of an electric interface device are described below.

Figure 6:
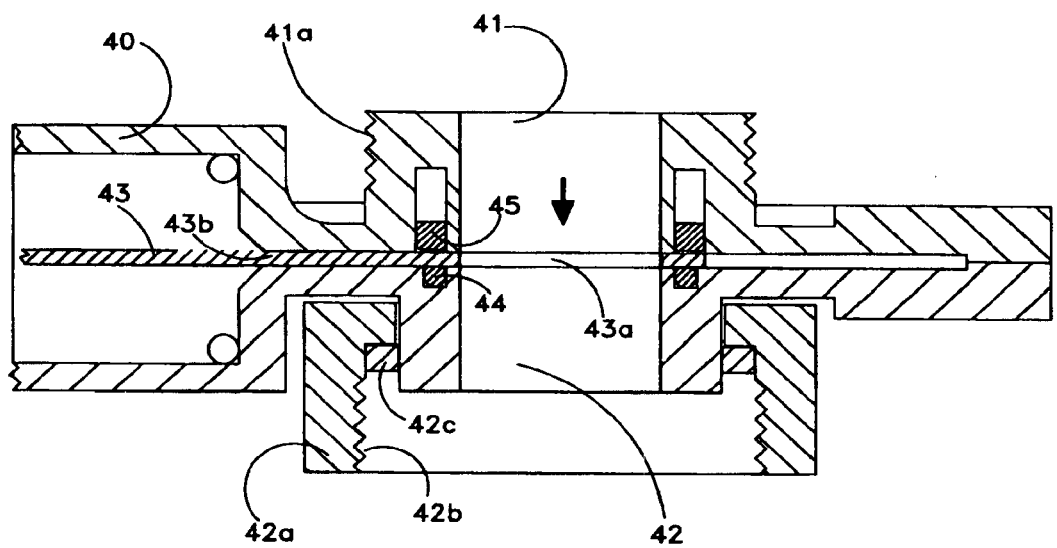
FIG. 6 is a cross-sectional view of a gas shut-off valve in an open position.

FIG. 6 is a detailed view in cross section of a preferred valve, such as valve 10, for shutting off the flow of gas. A housing 40 has an inlet 41 and an exit 42. The inlet has an external thread 41*a* that matches the threads of a standard gas meter. The exit 41 has a standard meter nut or a union nut 42*a* having internal threads 42*b* that will attach to a standard gas meter. The union nut 42*a* is held in place by a keeper 42*c*.

The housing 40 includes a gate 43 as a valve member for shutting off the flow of gas between the inlet 41 and the exit 42. The gate 43 has an open section 43*a* that allows gas to flow there through to the outlet 42. It further includes a solid section 43*b* which closes the gas passage between the inlet 41 and the outlet or exit 42 when the gate is slid toward the right as seen in the figure.

In a preferred feature according to the present invention, the gate 43 has a bottom seat 44 and a top seat 45 that prevent gas from leaking past the fluid path or gas passage as the gas passes from the inlet 41 to the outlet 42. Both the bottom seat 44 and the top seat 45 extend annularly around the gas passage in contact with the gate 43, forming seals therewith. They are provided in respective spaces or groups provided in the housing 40. The seats can comprise O-rings of suitable seal material given the pressure and wear conditions.

Note that the external thread 41*a* and the meter union nut 42*a* could be eliminated and replaced by internal and external pipe threads in the inlet 41 and the outlet 42 of the valve 40.

Figure 7:
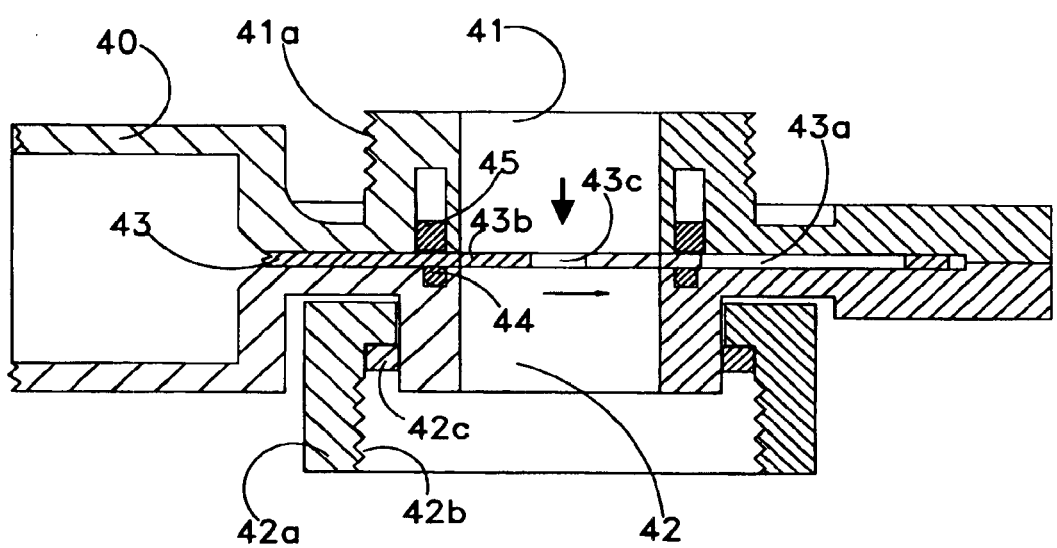
FIG. 7 is a cross-sectional view of the valve of FIG. 6 in a closed position.

FIG. 7 shows the valve of FIG. 6 in a closed position, but with one modification. In the solid section 43*b*, an optional orifice 43 may be provided to allow a predetermined small amount of gas to pass there through from the inlet 41 to the outlet 42. The orifice is sized so as to allow a sufficient amount of gas to pass through the valve to maintain downstream pilot lights lit, allowing for a reset of the valve and a resumption of operation of the system without having to relight the pilot lights. However, this orifice is not required, and is entirely optional.

With the valve as illustrated in FIGS. 6 and 7, the gate 43 slides between the two seals 44 and 45, being movable from the open to the closed position. When the gate 43 is in the open position, the seal is protected from contamination affecting the sealing surface. There is little effect on the flow of gas in terms of pressure drop due to the seals.

Figure 7A:
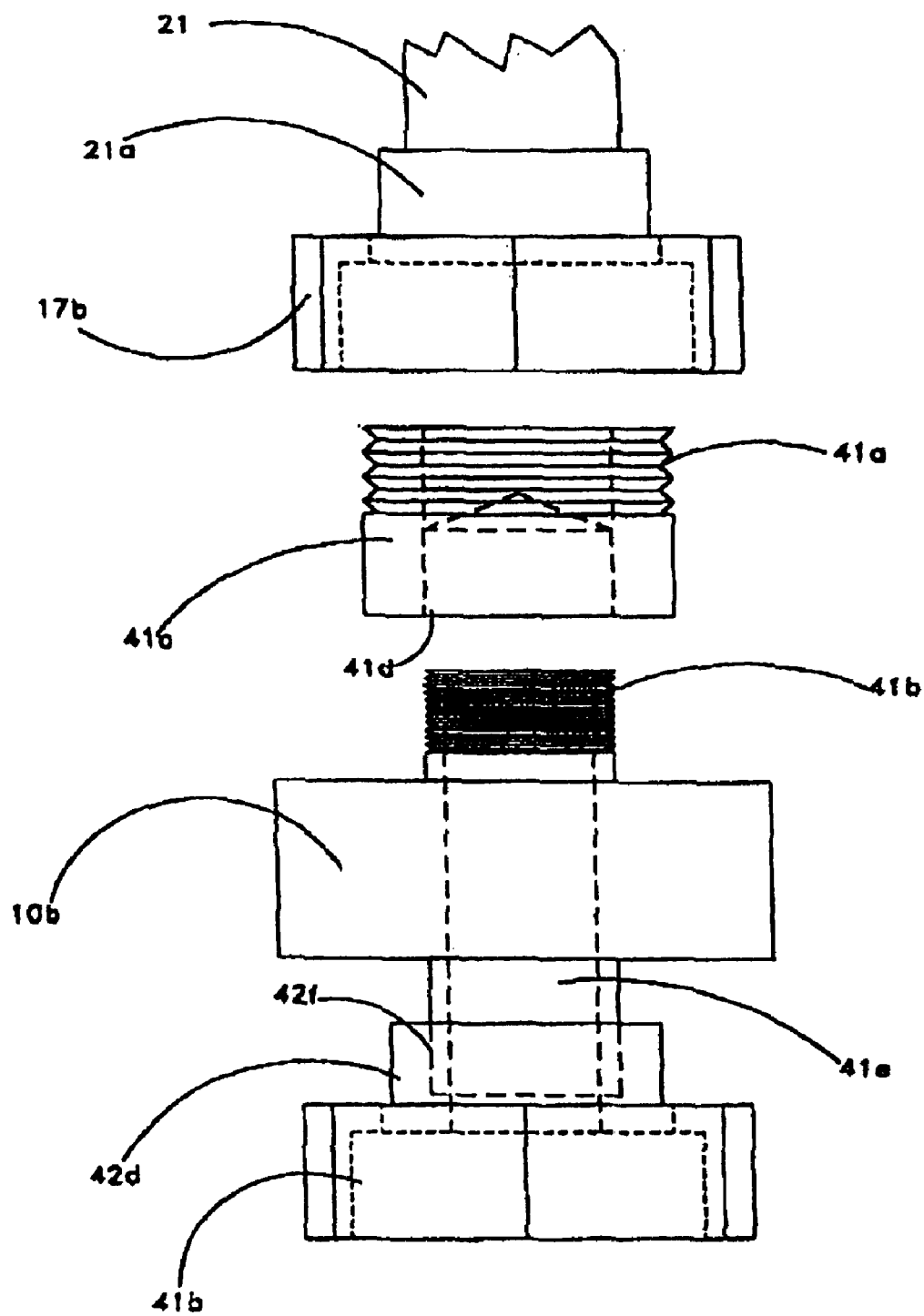
FIG. 7A is an exploded view of a fitting adaptor.

In FIG. 7a reference 10b represents any appropriate shut-off valve for gas. This Figure illustrates a way of adapting any such valve 10b for adaptation in use with a method of installation of the present invention.

Specifically, a fitting adapter 41c has an external thread 41a and can be connected with the standard meter nut 17b. Internal threads 41d on the fitting adapter 41c match threads of a standard pipe 41b. The pipe thread 41b can be formed as part of the valve 10b, where a standard nipple can be used. A standard union nut fitting 42d having internal threads 42f is shown together with a union nut 41b. The fitting 42d is connected to the valve 10b by connection 41e which includes standard external pipe threads on the valve 10b that match the standard internal threads 42f of the standard meter fitting 42d. The connection 41e can be a standard pipe fitting, or could be formed as part as the valve 10b.

Accordingly, any such valve 10b having pipe threads 41b can have a standard union nut fitting 42d connected to one side and a fitting adapter 41c connected to the other side for connection to a standard union nut and a standard gas meter. Accordingly, any appropriate valve can be modified to be employed as a shut-off valve interface for a gas meter in accordance with the present invention.

Figure 7B:
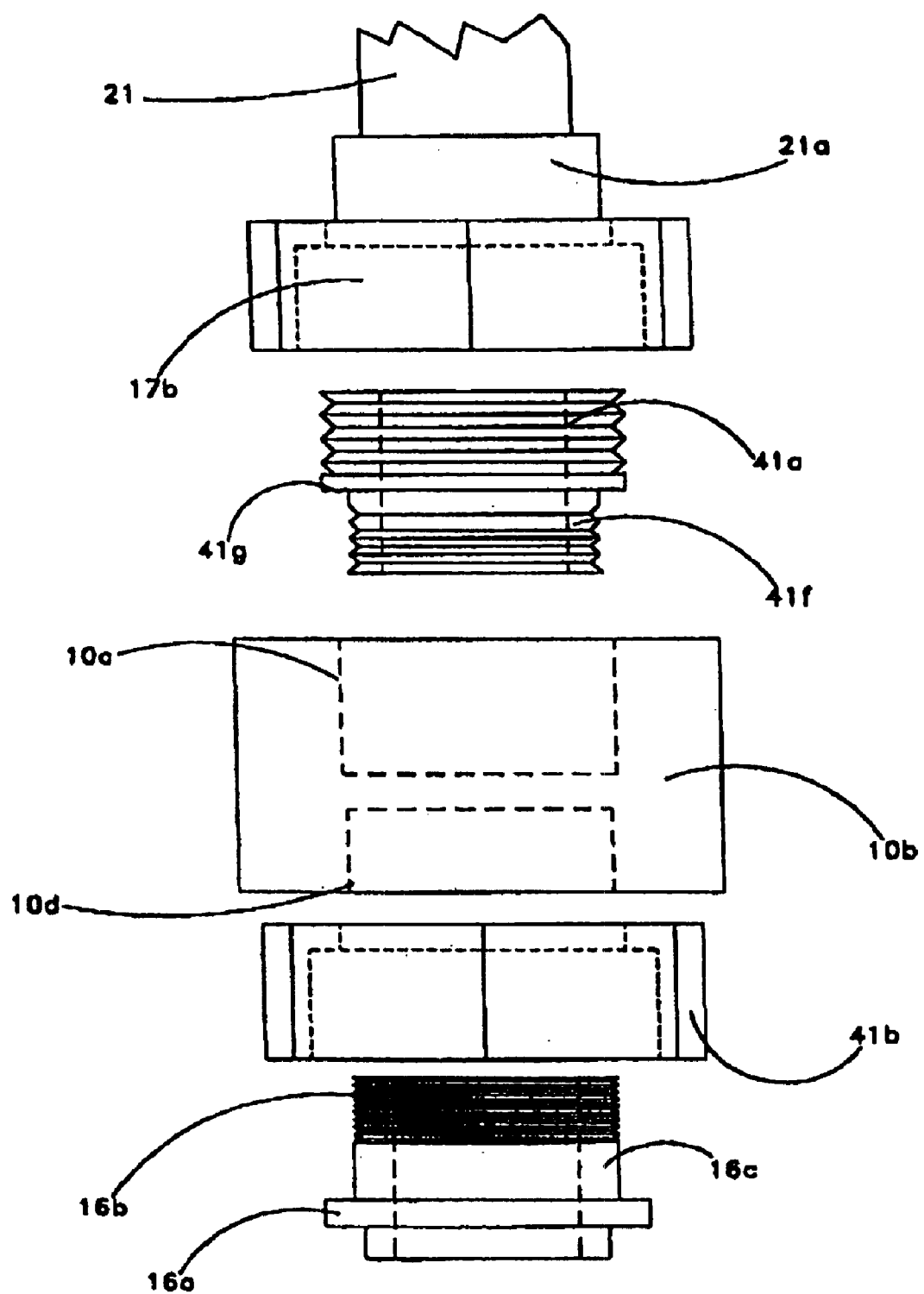
FIG. 7B is an exploded view of an alternative of a fitting adaptor.

FIG. 7b shows an alternative arrangement having a fitting adapter similar to that shown in FIG. 7a. In FIG. 7b, the fitting adapter 41g has an external thread 41a that can be connected with a standard meter nut 17b. External threads 41f on the fitting adapter 41g are designed to match a standard pipe thread 41b. The pipe thread 41b can be formed as part of the valve 10b, or a standard nipple can be used. As seen in the Figure, the valve 10b has an internal thread 10c. Accordingly, this arrangement allows for the advantage of a relatively close coupling in connecting a valve. This will reduce the amount of space that is needed to install the valve.

FIG. 7b further shows a meter nut fitting 16c. Meter nut fitting 16c is essentially the same as a standard union nut fitting, except that it has external threads 16b. Threads 16b are adapted to connect with internal threads 10d of the valve 10b as illustrated. Flange 16a is designed to hold the meter nut 41b in place. This meter nut fitting 16c also allows a relatively close coupling with the valve 10 so as to reduce the amount of space required.

Figure 8:
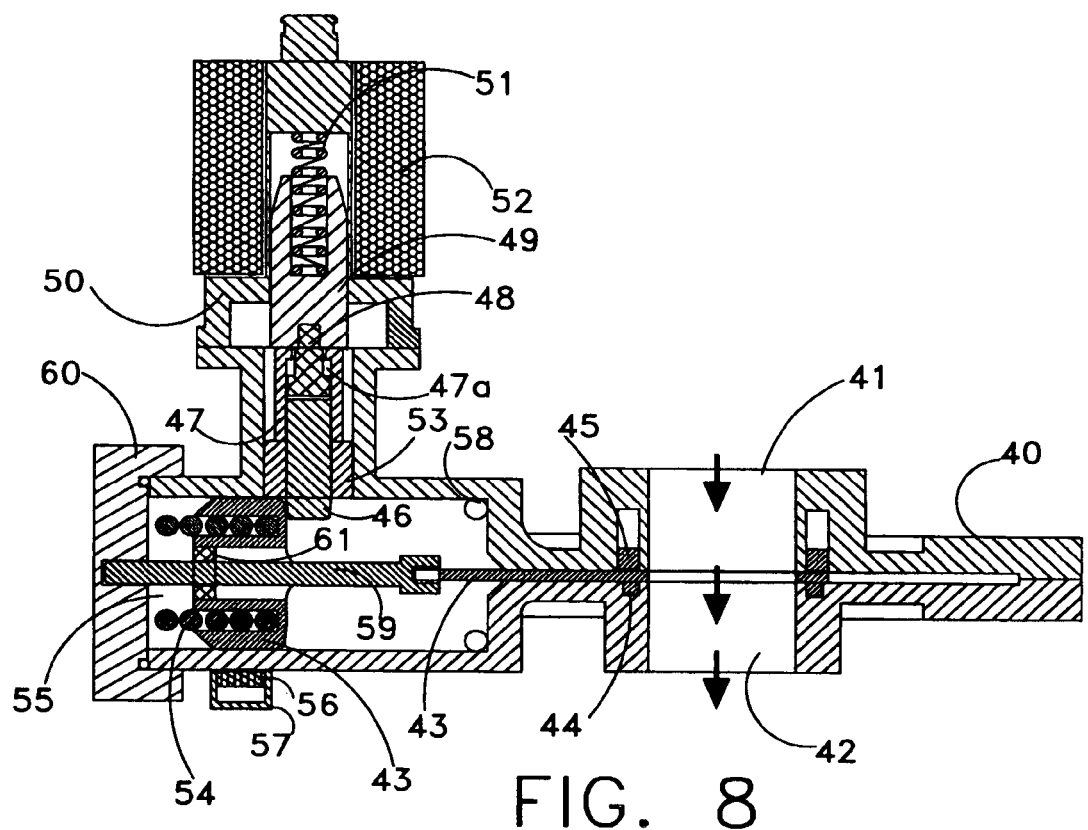
FIG. 8 is a cross-sectional view of a complete valve arrangement according to the valve of FIGS. 6 and 7.

Turning now to FIG. 8, this figure represents a cross-sectional view of a valve essentially similar to that as discussed with respect to FIGS. 6 and 7. The gate 43 is more completely illustrated in FIGS. 8 and 9, and is designed to receive a spring 54. One end of the spring 54 pushes against an end pate 55 connected to the housing 40, and the other pushes against the gate 43. As can be seen from FIGS. 8 and 9, as well as looking at remaining FIGS. 10 and 11, for example, the left-hand end of the gate 43 as seen in the figures includes an expanded spring receiver portion for gate member. This spring receiver portion or gate member is held by a release pin 46 so as to hold the gate 43 in the open position against the action of the spring 54.

The housing 40 includes a chamber in which a gate 43 and the spring 54 reside. The release pin 46 projects into this chamber through a bushing 53. The bushing 53 allows for relatively easy movement of the release pin 46, thus reducing the amount of force required to move the release pin 46. As can be seen, upon retraction of the release pin 46 from the chamber, the gate member is released and the spring can push the gate 43 to the closed position thereof.

The release pin 46 is connected to and fixed with respect to a connector 47, essentially formed as a cylinder on the outer side thereof. The connector 47 forms a wider portion on the release pin 46 so that it effectively forms a stop for stopping against the bushing 53. Accordingly, the connector 47 stops the release pin 46 at a proper position of extension into the chamber of the housing 40.

It is noted that the connector 47 has a slot or axial chamber 47a, essentially forming a gap therein, or axial space. In this axial space, a link pin 48 resides. The link pin 48 has an end portion wider than the opening therefor in the end of the connector 47. Accordingly, as the link pin 48 travels upwardly, it does not pull on the connector 47 until the wider portion at the end thereof engages with the upper end of the connector 47. Accordingly, this allows for the link pin 48 to axially travel before engaging the connector 47. A solenoid pin 49 of a solenoid 52 is fixed with respect to the link pin 48 for movement thereof. This will be discussed in more detail below.

A status indicator 57, furthermore, is provided in the housing 40. The status indicator 57 is made of a material that will be attracted to the gate 43 in the open position thereof, as shown in FIG. 8. For example, a magnet 56 can be placed in the status indicator 57 that will be attracted to the gate 43 in the open position so as to indicate that the valve as a whole is in the open position.

Figure 9:
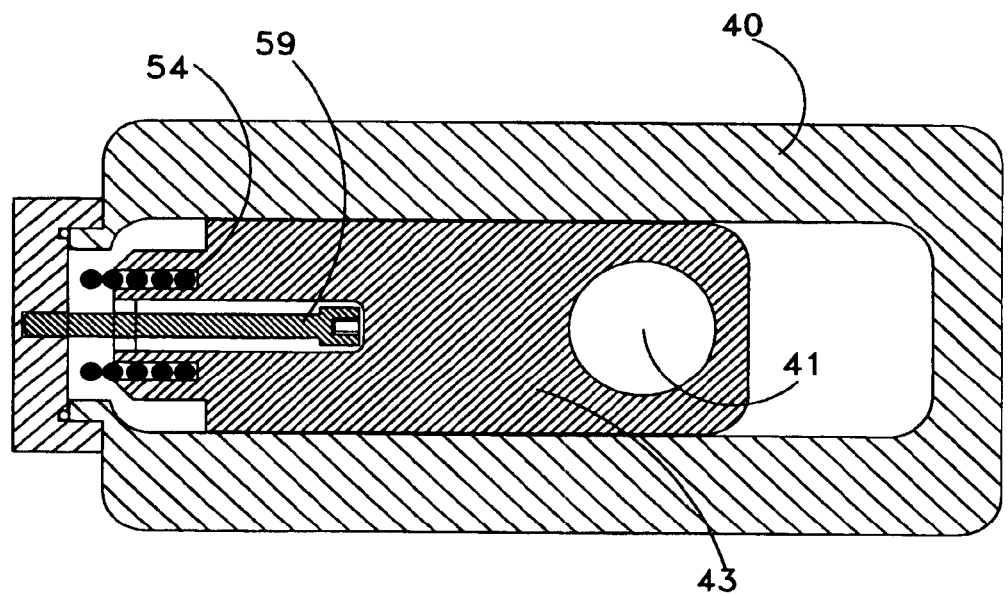
FIG. 9 is a cross-sectional view of the valve of FIG. 8 as seen from above.

The valve of FIGS. 8 and 9 thus illustrates a spring loaded gate valve that is held in the open position by the release of pin 46. The status indicator 57 indicates the open position of the valve. By use of the release pin 46, no electric power is required to maintain the valve in the open position.

Figure 10:
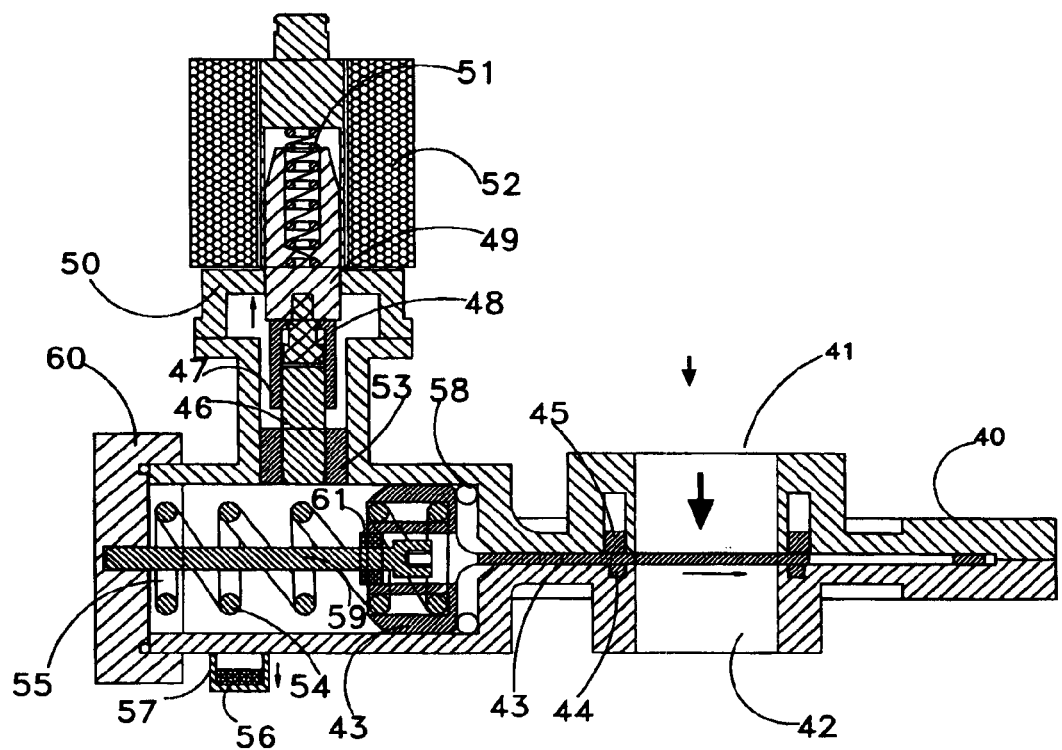
FIG. 10 is a view similar to FIG. 8, but showing the valve in a closed position.
Figure 11:
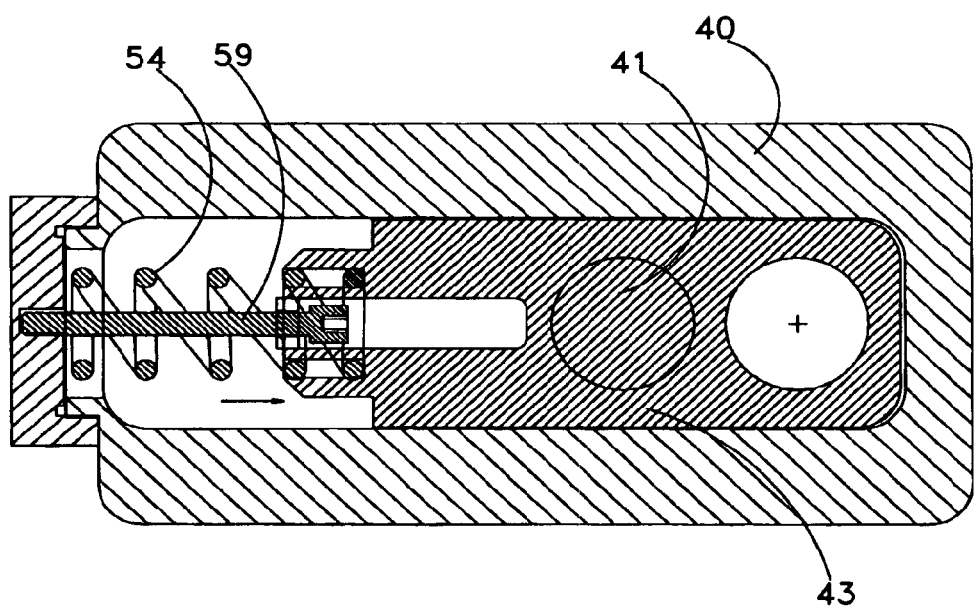
FIG. 11 is a view similar to FIG. 9, but showing the valve in a closed position.

FIGS. 10 and 11 illustrate the valve having moved to the closed position thereof. The solenoid 52 is connected to the housing 40 through a further housing 50. Ordinarily, the solenoid pin 49 is biased toward the engaged position of the release pin 46 by a solenoid spring 51. However, when the solenoid pin 49 is pulled as a result of energizing the solenoid 52, the solenoid pin 42 moves against the force of the solenoid spring 51 until the link pin 48 closes the gap 47a and contacts the connector 47. This causes an impact force on the release pin 46, thus securely and forcibly moving the release pin 46 from engagement with the gate 43. As the solenoid pin 49 continues to move the release pin 46 to the point where it causes the gate 43 to be released, the spring 54 then moves the gate 43 to the closed position. As a result, the status indicator 57 has the magnet 56 thereof released from engagement with the gate 43, due to the gate 43 having moved to the closed position. That is, the magnetic material of the gate 43 that was present at the position of the status indicator 57 is no longer present, and the magnet is released to indicate the closed status of the valve. By having the link pin travel a certain distance through the connector 47 without engaging the connector 47, link pin 48 is allowed to accelerate so as to cause an impact force on the connector 47. This impact force has the advantage of greatly reducing the amount of energy that is actually required to release the gate 43.

Figure 12:
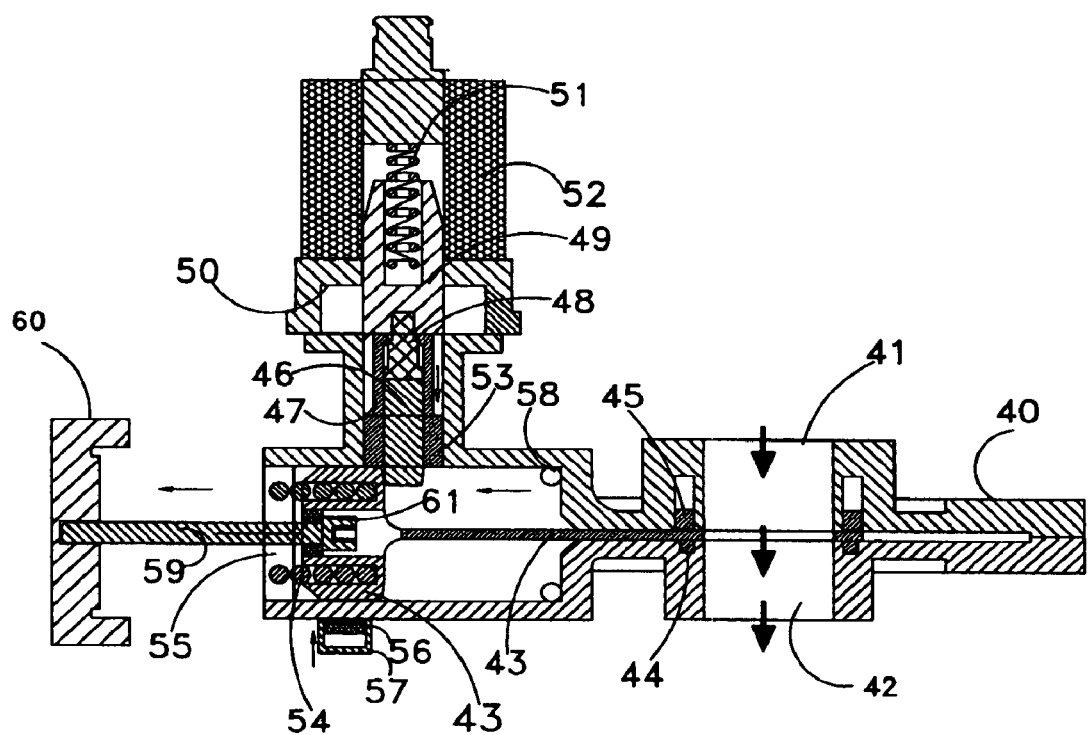
FIG. 12 is a view similar to FIG. 10 but illustrating process of resetting the valve.
Figure 13:
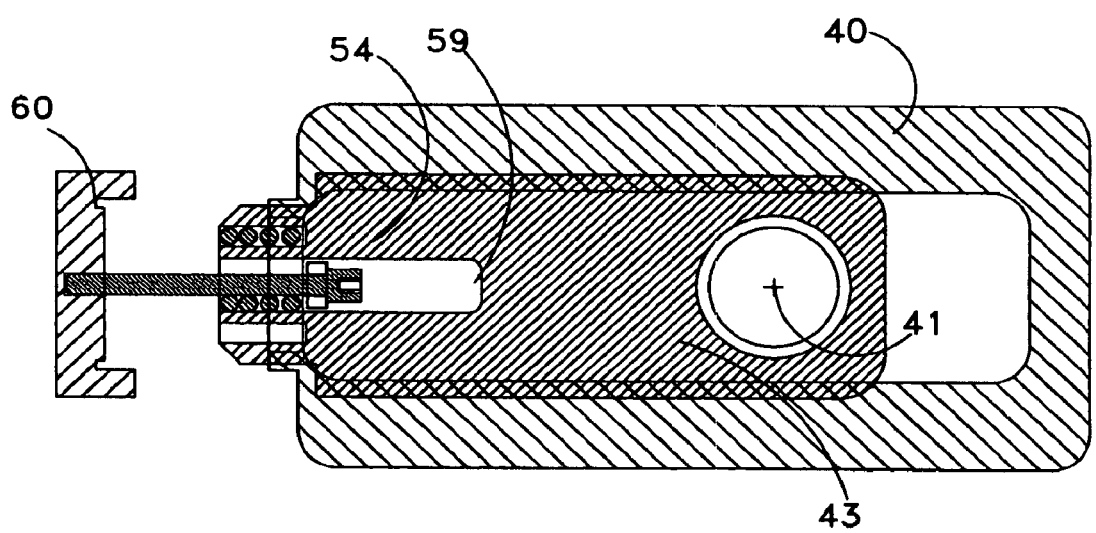
FIG. 13 shows the process of resetting the valve of FIG. 12 in a view similar to that of FIG. 11.

Turning to FIGS. 12 and 13, there is illustrated a method of resetting the valve. A knob 60 is connected to a reset pin 59, which extends into the chamber of the housing 43. An end of the reset pin 59 is received in a slot or channel formed in the gate 43, as for example seen in FIGS. 13 and 11. This slot, for example from the position of FIG. 9, allows the gate 43 to move unencumbered by the pin 59 to the closed position. The end of the pin 59, from the open position to the closed position, moves from a right-hand end of the slot to a left-hand end of the slot as shown by FIG. 11. Pulling the knob 60 to the left, accordingly, pulls the gate 43 to the left against the force of the spring 54, to the point where the release pin 46 engages the gate 43 under the action of the solenoid spring 51 so as to hold the gate 43, again, in the open position.

The end plate 55 includes an internal dynamic seal such as an O-ring around the reset pin 59. Further, a static seal on the end of the housing 40 engages with a corresponding groove in the knob 60, as can for example be seen by comparing FIG. 10 with FIG. 12, the seal remaining on the housing 40 between the two positions. These two seals serve to effectively maintain the chamber of the housing in a sealed state from the outside.

A stop 58 on the right-hand end of the chamber of the housing 40 allows for the gate member to be cushioned and stopped in an appropriate position at the closed position of the gate 43.

By having the gate 43 moved to the closed position without movement of the release pin 59, the gate 43 is allowed to close without any additional friction being applied to the movement of the gate.

Figure 14:
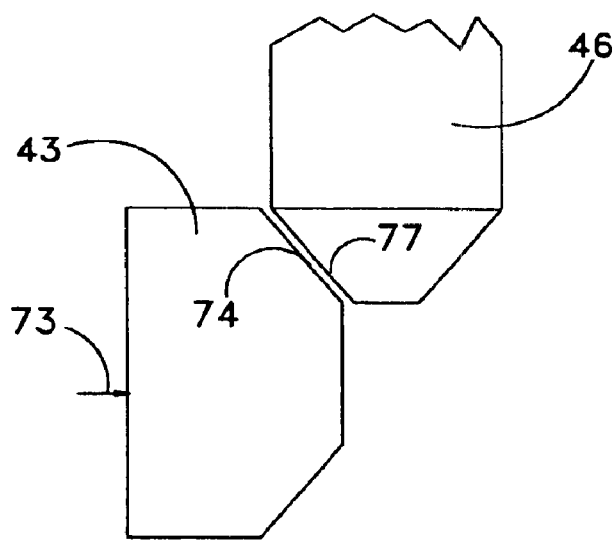
FIG. 14 shows a detail of one embodiment of engagement surfaces between a release pin and a gate.
Figure 15:
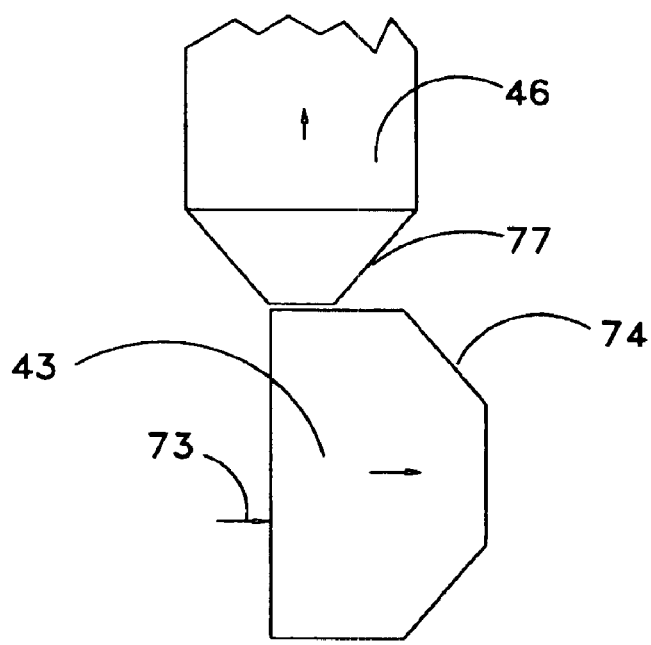
FIG. 15 illustrates the features of FIG. 14 after release of the gate.

FIGS. 14 and 15 show a detail of a preferred relationship between the release pin 46 and the gate 43 as discussed with respect to FIGS. 8–13. The release pin 46 has an engaging surface 77 and the gate has an engaging surface 74, which are both angular. By having both of these surfaces angular, the force required to disengage the release pin 46 from the gate 43 for movement in the direction 73 is reduced, and the overall energy required to operate the valve is also decreased.

Figure 15A:
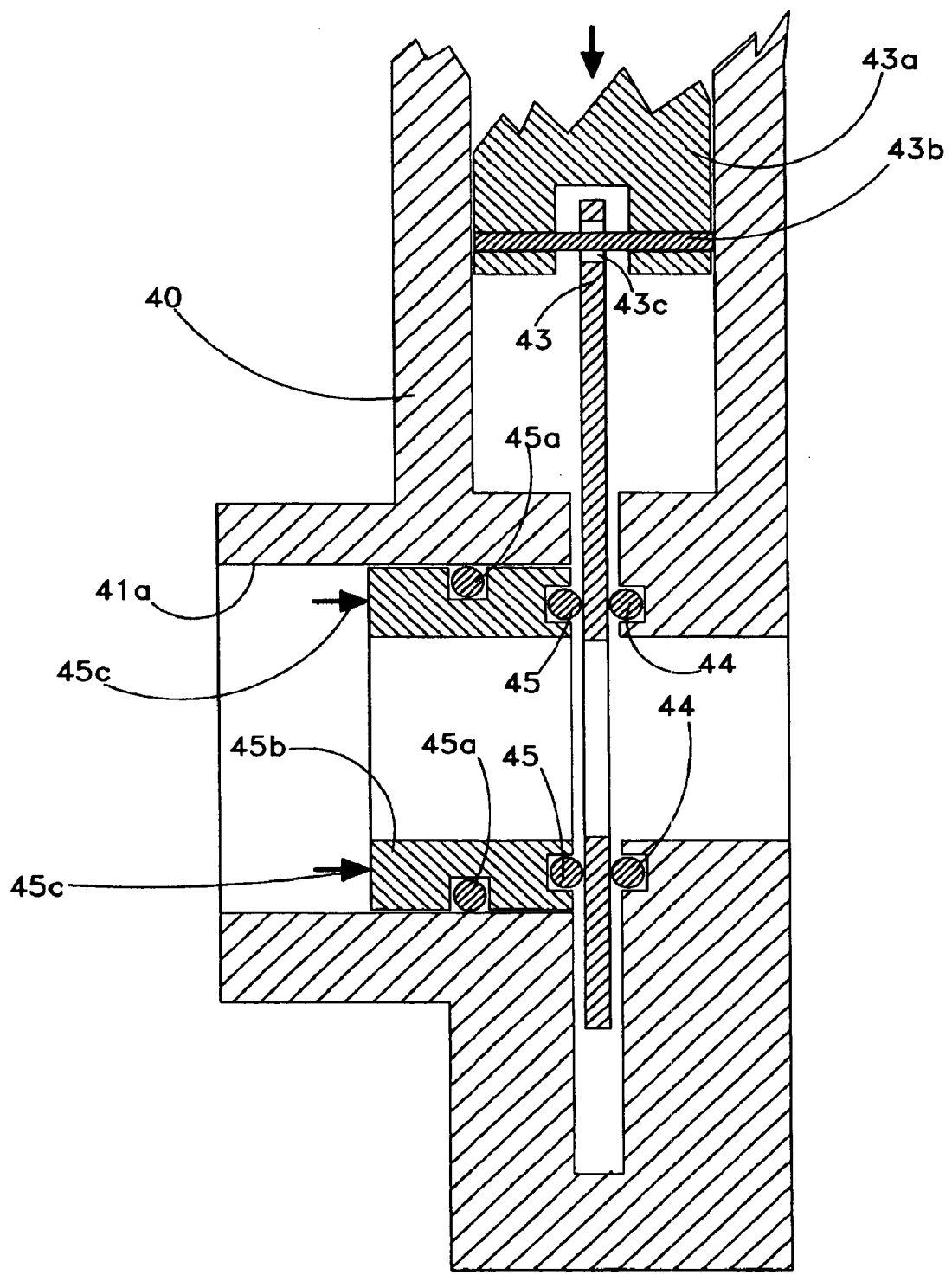
FIG. 15A is a cross-sectional view of a gate similar to that illustrated in FIGS. 6 and 7.

FIG. 15a shows a detail section of a gate valve similar to that previously shown. The gate 43 is sealed with a seat 44 and seat 45 on each side of the gate. Seat 45 is held into place by a piston 45b that has a seal 45a that seals in the cylinder 41a that is spring loaded and will apply a force 45c to seat 45, gate 43 and seat 44. This feature allows a constant predetermined force to be applied to the gate to form a seal. Further the gate 43 is connected by a link-pin 43b to a "spring loaded member" 43a. The link-pin 43b goes through the hole in the gate 43c. The link-pin 43b and the hole in the gate 43c have a "loose fit" that allows the gate to float and form a good seal with seat 44 and 45. Note that these features can be used together or alone. One advantage is to control manufacturing tolerances that may be a problem without one or both features.

Figure 16:
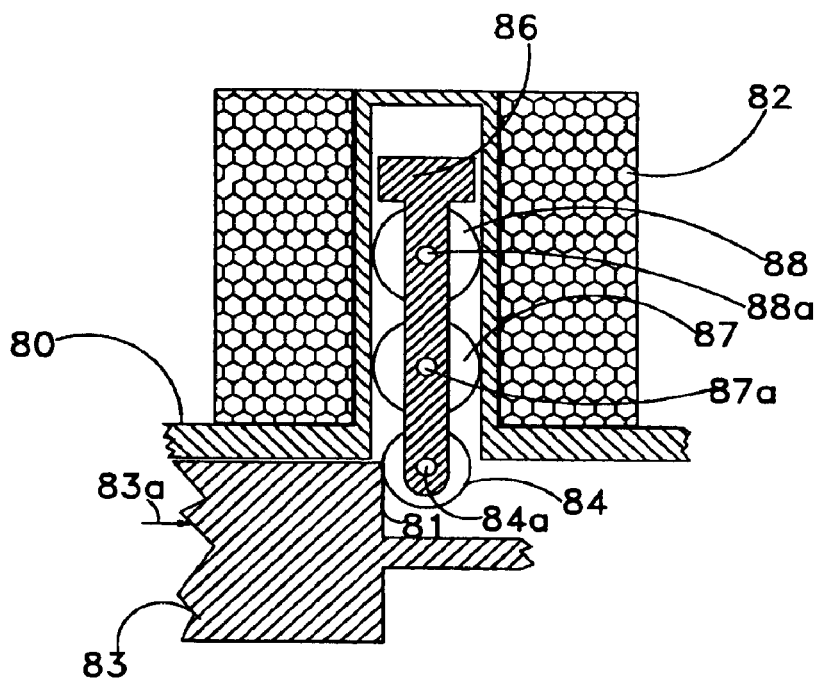
FIG. 16 is a view similar to FIG. 14 showing an alternative release member.
Figure 17:
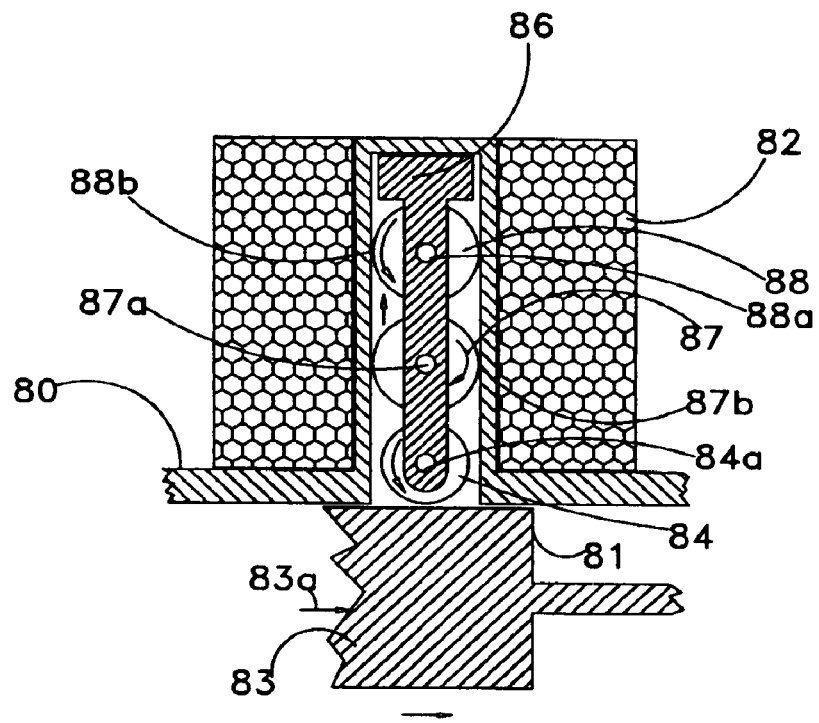
FIG. 17 shows the alternative release member of FIG. 16 in a view similar to that of FIG. 15.

Referring now to FIGS. 16 and 17, there is illustrated an alternative arrangement of a release pin for a gate member in a valve such as that discussed with respect to FIGS. 8–13. In these figures, reference number 83 represents a gate valve member, 81 represents an engaging surface for engagement with a release member and 83a represents a force applied to the valve member 83 for closing the valve member 83.

As shown in FIG. 16, the engaging surface 81 is locked against a release roller 84 for preventing the gate valve member 83 from moving. The engaging surface 81 could also be angular, as discussed with respect to FIGS. 14 and 15 in order to reduce the force required to disengage the release roller 84 from the gate of member 83.

A solenoid 82 acts on a solenoid pin 86. The solenoid pin 86 has two rollers, 87 and 88, pivotally mounted thereto at pivots 87a and 88a. These rollers allow the solenoid pin 86 to roll with respect to the solenoid 82. The release roller 84 is connected at the end of the solenoid 86 by a pivot 84a.

The force 83a applied to the valve member 83 is transferred to release roller 84, the first guide roller 87 and the second guide roller 88. Referring to FIG. 17, the gate valve member 83 is released by the rolling action of the release roller 84 being pulled by the action of the solenoid pin 86 when the solenoid 82 is energized. Thus the solenoid pin 86 has to be of a magnetic material, or a magnet.

The first guide roller 87 rolls on a surface 87b, and a second guide roller 88 rolls on a surface 88b in accordance with the forces applied thereto through the roller 84.

Use of the roller arrangement illustrated in FIGS. 16 and 17 reduces the force requiring to release the valve member. Additional rollers provide a rolling trigger, thus requiring less energy to release the valve member.

Figure 18:
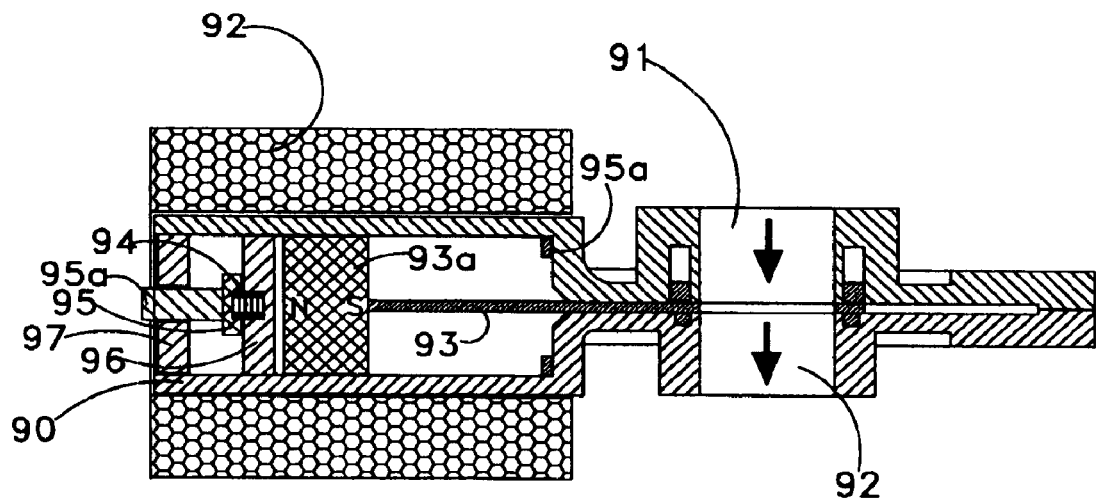
FIG. 18 is a cross-sectional view of another embodiment of the gas shut-off valve according to the present invention.
Figure 19:
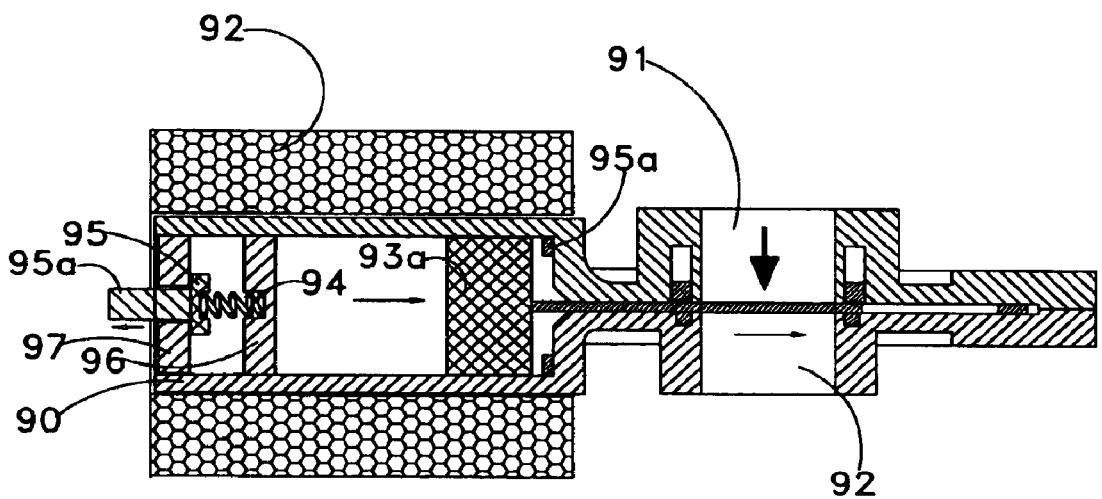
FIG. 19 shows the valve of FIG. 18 in a state of activation toward closing the valve.

Referring now to FIGS. 18 and 19, a gate valve design similar to that of FIGS. 6 and 7 is illustrated. That is, the gate itself, and its connection with respective seals, are similar to those of FIGS. 6 and 7. What is illustrated in FIGS. 18 and 19 is another way of actuating and resetting the valve.

In this case, a gate 93 is attached to a magnet 93a and movable in a valve housing 90 having a solenoid 92 mounted to the outside thereof. The magnet 93a has north and south poles that are arranged so that the magnet will be moved by energizing the solenoid 92.

FIG. 18 shows the valve member gate 93 in the open position, allowing gas to pass through an inlet 91 to an outlet 92.

A status indicator comprises an indicator 95a that is guided by an outer plate 97, the indicator 95a being attached to a target 95 made of a magnetic material, or a magnet. Indicator 95a and the target 95 are attracted to the magnet 93a of the valve member 93. By such attraction, a spring 94 is compressed. The attraction between the indicator 95a, target 95 and magnet 93a further help to hold each other in position.

Energization of the solenoid 92 activates the valve 90. Referring to FIG. 19, such Energization of the solenoid 92 moves the magnet 93a and thus the gate 93 to the closed position. It is noted that the polarity of the solenoid 92 required to activate the valve member 93 toward the closed position depends upon the orientation of the north and south poles of the magnet 93a.

As the valve member 93 and the magnet 93a move to the closed position, the indicator 95a and the target 95 will lose the magnetic attraction to the magnet 93a. Accordingly, the spring 94 then pushes the indicator 95a and the target 95 outward, projecting the indicator 95a beyond the outer plate 97. This then indicates the status of the valve member 93.

When the magnet 93a moves the valve member 93 to the closed position, magnet 93a is attracted to a second target 95a at the right-hand end of the housing 90. This helps to hold the valve member 93 in the closed position. This second target 95a at the right-hand end of the housing 90 may not be necessary in some applications because friction will be sufficient to hold the valve member 93 in place.

It is further noted that the status indicator is not required for the valve to operate.

In order to reset the valve member 93, the polarity of the solenoid is reversed so as to move the magnet 93a and the valve member 93 to the open position. When the valve member 93*a* reaches the open position, the magnet 93*a* again attracts the first target 95 and indicator 95*a* to show the open status of the valve.

Accordingly, with the embodiment of FIGS. 18 and 19, by providing a magnet within a coil to operate the gate 93, remote on/off control can be provided. The status indicator operates off of the movement of the magnet, and can also provide a way of holding the valve member in place.

Figure 20:
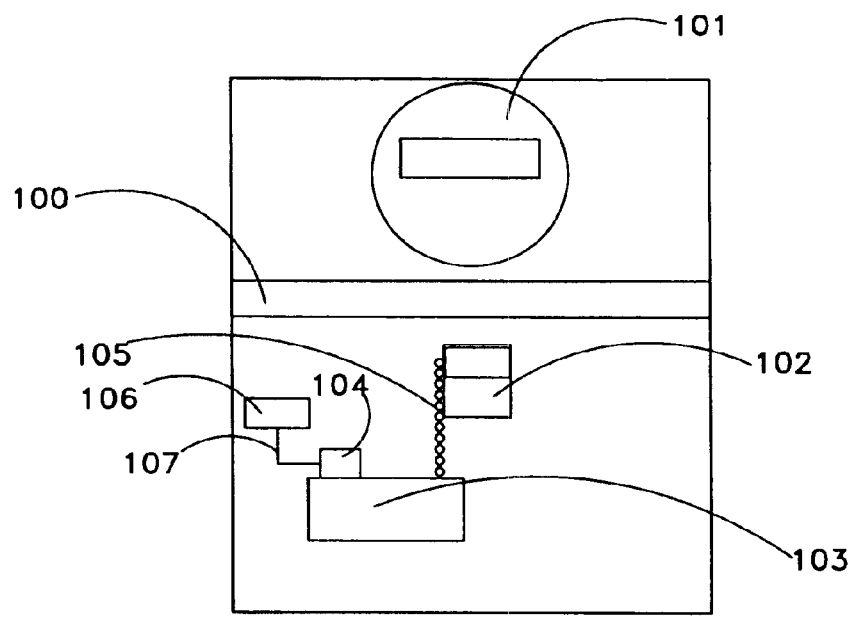
FIG. 20 is a schematic view of an electricity shut-off arrangement according to the present invention.
Figure 21:
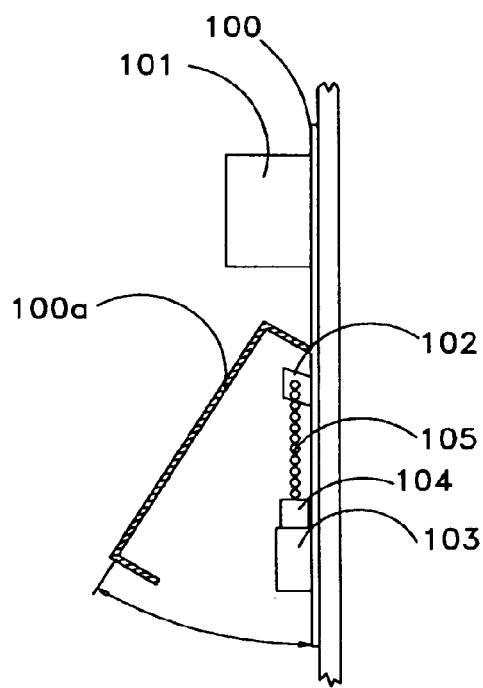
FIG. 21 is a partly cross-sectional view of the arrangement of FIG. 20.

FIGS. 20–21 schematically demonstrate a way of shutting off electric power. A meter box 100 has an electric meter 101 mounted thereon together with a circuit breaker 102. The circuit breaker 102 has a pull chain 105 connected thereto. The pull chain 105 is engaged with an electricity shut-off device 103 also mounted on the meter box 100. A control module 106 is located at a remote location and can communicate with the electricity shut-off device 103 through a wire 107 or by radio frequency. The power for operating the electricity shut-off device 103 is either self-contained, or can be provided by an outside source.

Figure 22:
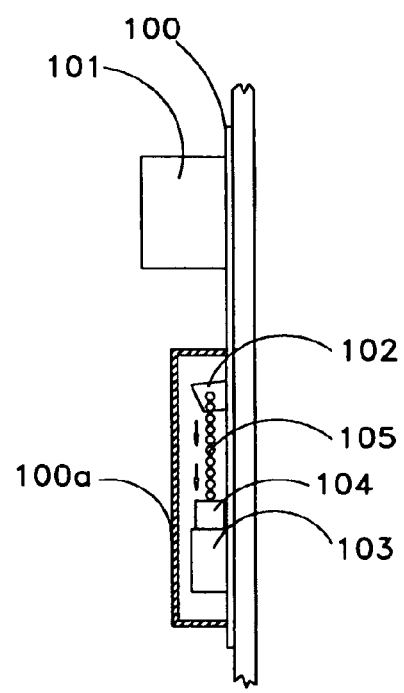
FIG. 22 is similar to FIG. 21 but illustrates the device in a closed position.

A door 100*a* as shown in FIG. 21 can be included, shown in this figure in an open position. It is shown in the closed position in FIG. 22. Further, FIG. 22 shows activation of the electricity shut-off device 103, which pulls on the pull chain 105 to activate the circuit breaker 102. The electricity shut-off device can be spring-loaded, a solenoid, or a motor activated device.

The advantage of the arrangement of FIGS. 20–22 is that of having a way of shutting off the electricity which can be activated remotely and is self-contained. It allows the shut off of electricity without requiring breaking into the electric panel box, and is designed to fit behind the door thereof, allowing the door to be closed. Other ways of connecting between the shut-off device 103 and the breaker 102 than the pull chain 105 can be imagined.

Figure 23:
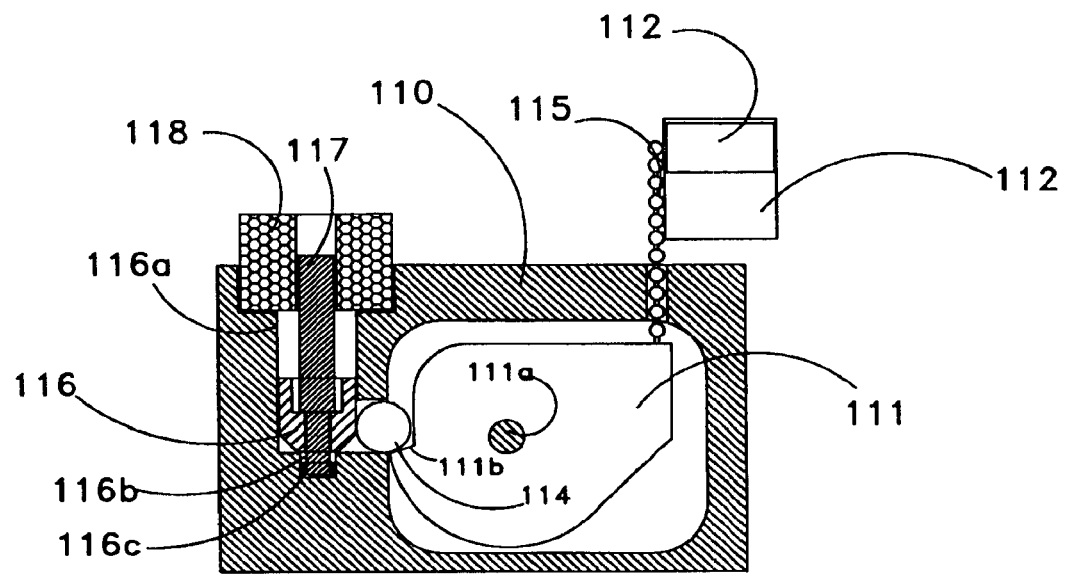
FIG. 23 is a partly cross-sectional view of a first embodiment of an electricity shut-off device according to the present invention.
Figure 24:
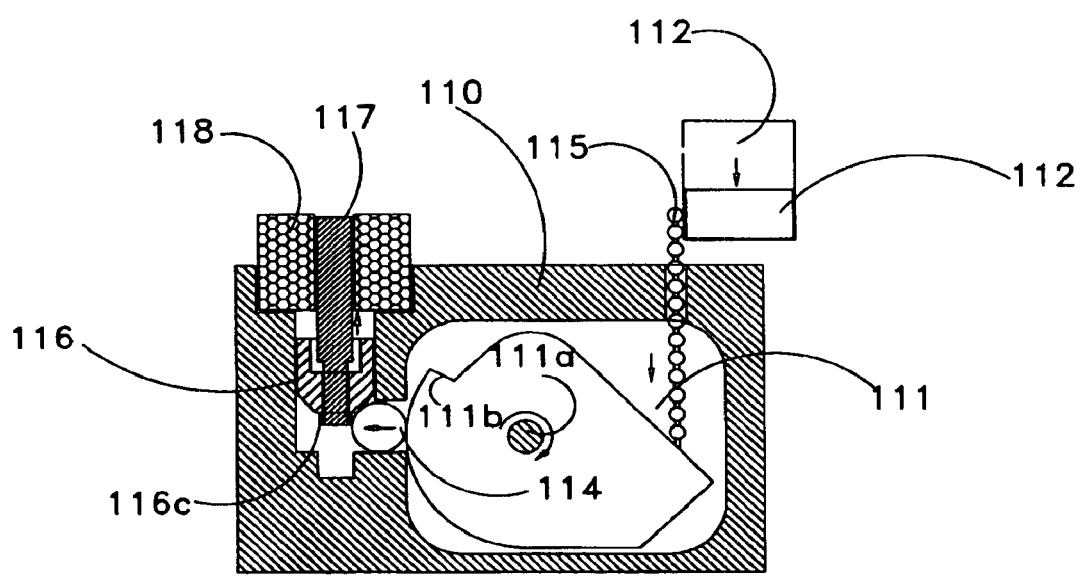
FIG. 24 is a partly cross-sectional view of the device of FIG. 23 shown in an activated state.

FIGS. 23 and 24 illustrate a specific embodiment of an electricity shut-off device that could, for example, be used with the arrangement shown in FIGS. 20–22. In this arrangement, a spring-loaded shut-off device 110 has a rotatable spring-loaded arm 111 mounted to a pivot 111*a* having one end attached to a ball chain 115 as a pull chain. The other end of the pull chain 115 is attached to a circuit breaker 112. The spring loaded arm 111 is locked into position by a ball 114. An angled detention surface 111*b* is formed on the arm 111 for engagement with the ball 114. The ball is restrained by a release pin 116 that is movable in a cylinder 116*a* formed in the device 110. The angular surface 111*b* pushes against the ball 114 and applies pressure to the release pin 116. A solenoid pin 117 is movable with respect to a solenoid 118 and is allowed to move within the release pin 116 without moving the release pin 116 until a certain amount of slack illustrated at 116*b* is taken up and a stop 116*c* on the end of the solenoid pin 117 contacts the release pin 116.

Operation of the device is illustrated in FIG. 24. When the solenoid 118 is energized, the solenoid pin 117 is pulled up to first remove the slack 116*b*, and then pull the release pin 116 up to a position that allows the ball 114 to move into the space vacated by the release pin 116. After the ball 114 has moved to this point, the spring-loaded arm 111 is released, and rotates under its spring-load.

Rotation of the spring-loaded arm 111 causes the chain 115 to be pulled and the circuit breaker 112 to be moved to the off position. In order to reset the spring-loaded shut-off device 110, the spring-loaded arm 111 is rotated against the spring pressure until the ball 114 clears the angled surface 111*b* and the release pin 116 moves downward to push the ball 114 back into place restraining the angled surface 111*b*. After the spring-loaded shut-off device 110 has been reset, the circuit breaker 112 can be reset.

By having this slack in the movement of the solenoid pin 117, an impact force is created for movement of the release pin 116. This reduces the amount of energy required to release the device. By using a ball, the force applied to the release pin is reduced. Further, by having the ball press against an angled surface, the amount of force on the release pin is further reduced.

Figure 25:
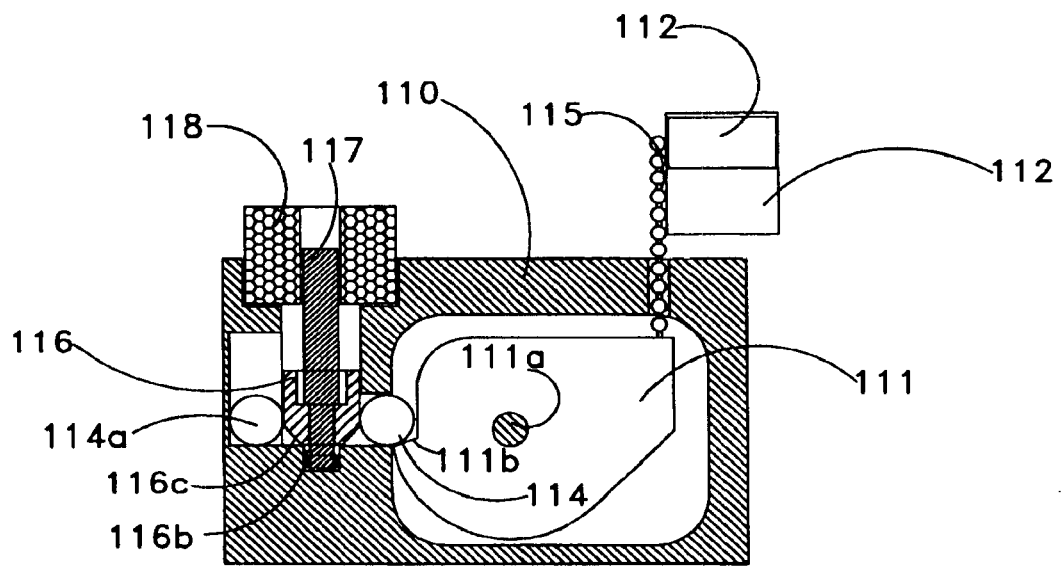
FIG. 25 shows an alternative to the embodiment of FIG. 23.
Figure 26:
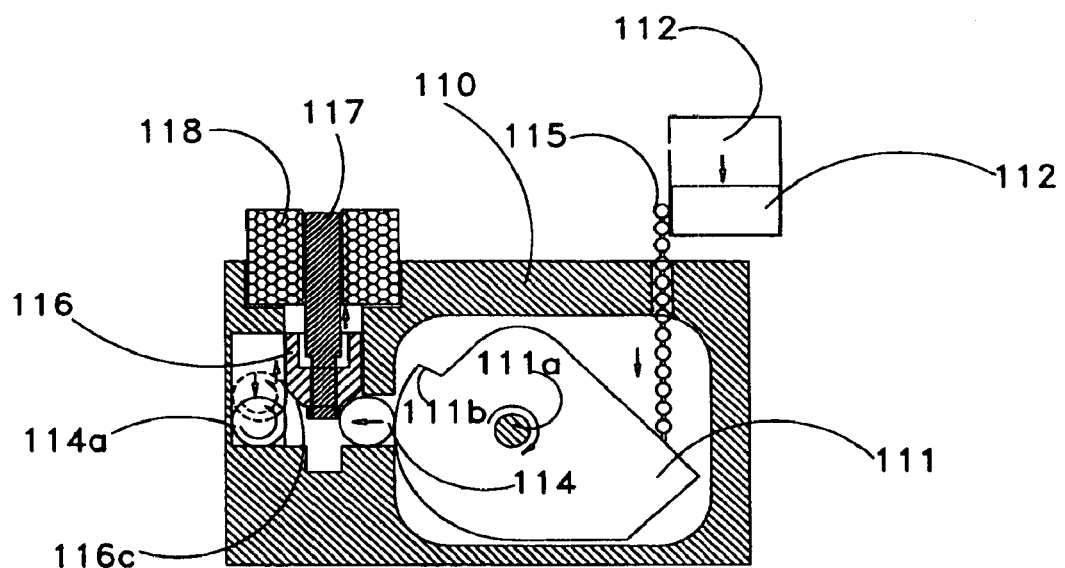
FIG. 26 illustrates the activated state of the alternative of FIG. 25.

FIGS. 25 and 26 are similar to FIGS. 23 and 24, which shows an alternative arrangement in which a second ball 114*a* is provided which has a center in line with the center of the first ball 114. This arrangement is provided in order to reduce the amount of friction on the release pin 116.

Referring to FIG. 26, when the solenoid 118 is energized, the solenoid pin 117 pulls up to first remove the slack 116*b* and then pulls the release pin 116 up to a position allowing the first ball 114 to move into the space vacated by the release pin 116. As the release pin moves up, the second ball 114*a* rolls up along with the release pin 116 until the angled surface 116*c* moves past the center of the second ball 114*a*. At this point, the second ball 114*a* falls down back into its original place. When the ball 114 clears the spring-loaded arm 111, the arm rotates. Rotation of the spring-loaded arm 111 causes the breaker 112 to be shut off as in the embodiment of FIGS. 23 and 24.

Figure 27:
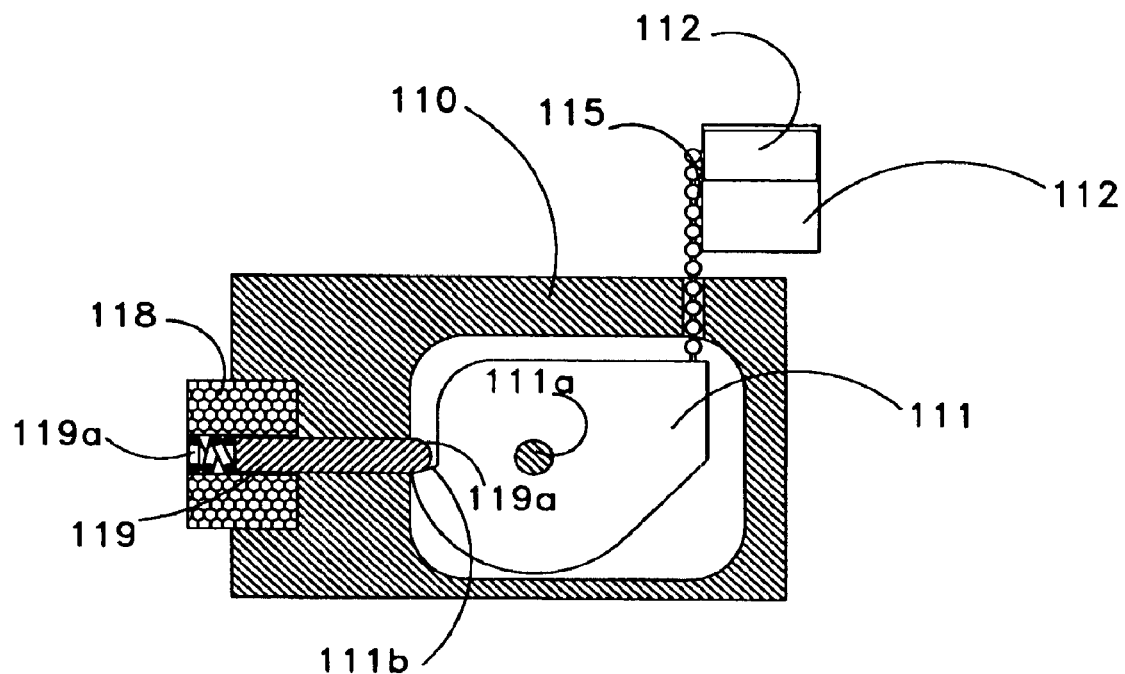
FIG. 27 is a partly cross-sectional view of a second embodiment of an electricity shut-off device according to the present invention.
Figure 28:
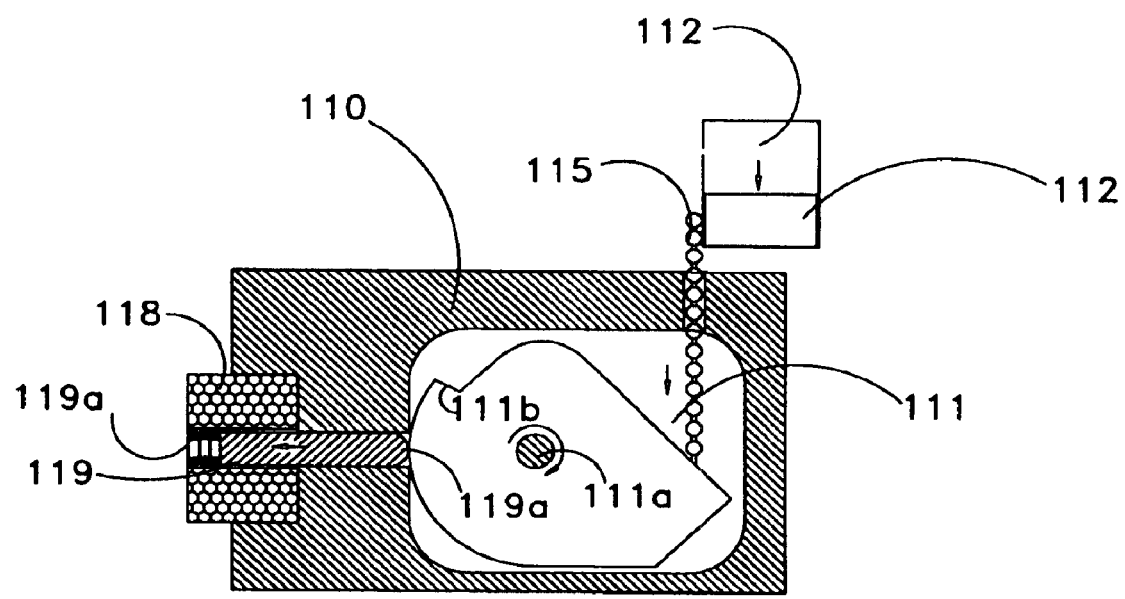
FIG. 28 is a partly cross-sectional view of the electricity shut-off device of FIG. 27 shown in an activated state.

FIGS. 27 and 28 illustrate a further embodiment of the electricity shut-off device 110. In this embodiment, the release pin and ball arrangement is replaced by a solenoid activated pin. Specifically, a solenoid pin 119 has an end surface 119*a* engaged with the angled surface 111*b* for detention thereof. The solenoid pin 119 is biased into position by a spring 119*a* on the left-hand end thereof. The solenoid pin 119 is moved by the solenoid 118.

When the solenoid 118 is energized, as seen in FIG. 28, the solenoid pin 119 is moved against the force of the spring 119*a* to release the spring-loaded arm 111, allowing it to rotate. Shut off of the circuit breaker 112 is similar to the above-described embodiments.

In order to reset the spring-loaded shut-off device 110, the spring-loaded arm 111 is rotated against the spring pressure until the solenoid pin 119 clears the angled detention surface 111*b* and is pushed back into place by the spring 119*a*.

The embodiment of FIGS. 27 and 28 requirements fewer moving parts than the embodiments of FIGS. 23–26. However, more energy may be required for operation.

Figure 29:
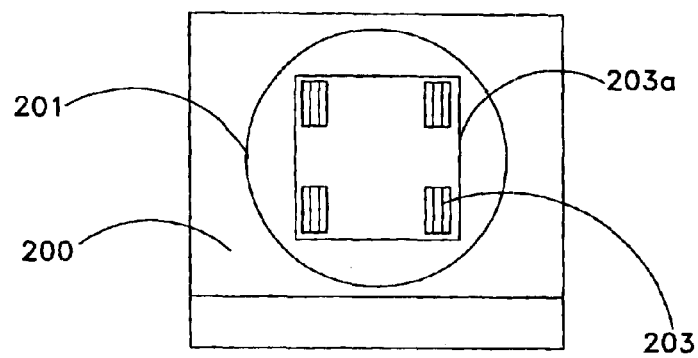
FIG. 29 is a front view of an electric meter box.
Figure 30:
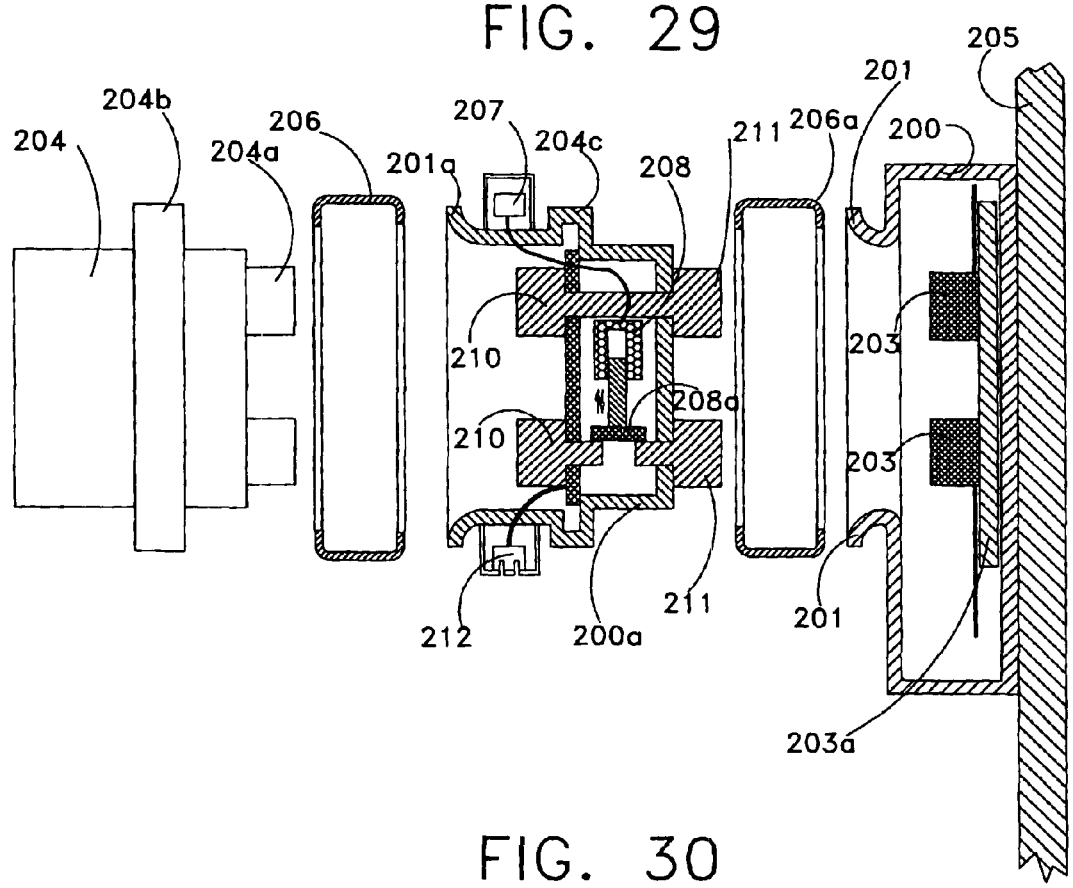
FIG. 30 is a partly cross-sectional exploded view of an electrical interface for use with electric gas meter and a metered box according to the present invention.
Figure 31:
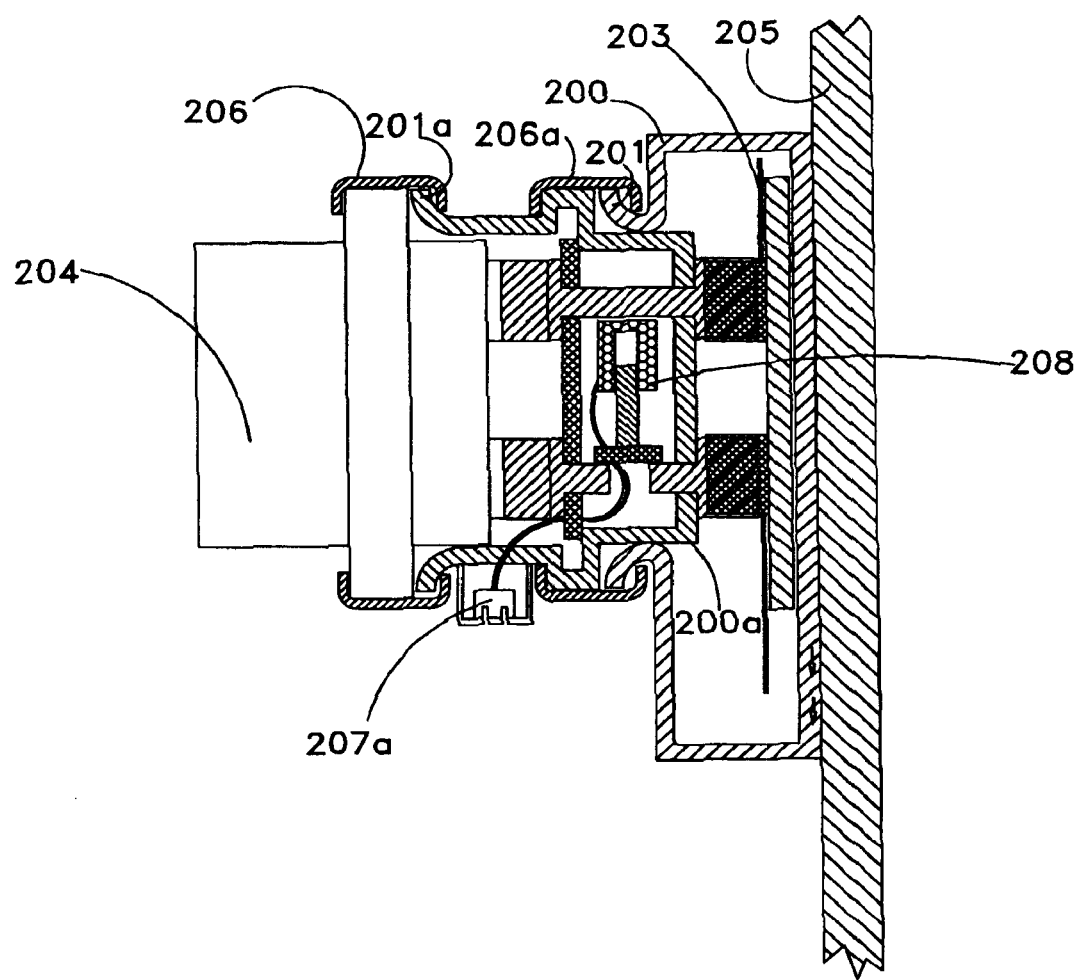
FIG. 31 is a partly cross-sectional view of the assembled electric meter, interface device and meter box of FIG. 30.

FIGS. 29–31 illustrate an electricity shut-off and external power supply device that interfaces with an electric meter box, and is referred to as an electric interface. This may be used as electric interface 34 of FIG. 5, for example. The purpose of this electric interface is to provide an easy and economic way of providing for a remote shut-off of the electric power, and to further provide electric power to operate the system described with respect to FIG. 5.

Referring first to FIG. 29, there is illustrated a standard meter box 200, which includes a meter mounting flange 201, meter box receptacles 203 and a receptacle mounting plate 203*a*.

FIG. 30 is a cross-sectional view including an electric meter 204, electric interface device 200*a* and the standard meter box 200. The standard electric meter 204 includes meter plugs 204*a*, which would ordinarily be engaged with meter box receptacles 203, and a meter flange 204*b*. The meter flange 204b would ordinarily be interconnected with the meter mounting flange 201 by a band such as a security band 206 or 206a. However, the electric interface device 200a is provided to be disposed between the electric meter 204 and the standard meter box 200.

The electric interface device 200a includes a housing having an interface flange 201a and an interface flange 204c. The flange 201a is connected with the flange 204b by band 206 for connecting the electric interface device 200a to the electric meter 204. The flange 204c is connected with the flange 201 of the meter box 200 by a security band 206a. The interface can thus be locked to the respective components. The meter box 200 is mounted to a structure 205, furthermore.

The electric interface device 200a further comprises interface receptacles 210 to be connected with meter plugs 204a and interface plugs 211 to be connected with meter box receptacles 203. At least one set of an interface plug 211 and an interface receptacle has a discontinuity therein that is closed by a shut-off member 208a of a solenoid switch 208. When the shut-off member 208a of the solenoid switch 208 is in its closed position, an actual connection is thus established between the receptacles 203 and plugs 204a.

Electric interface device 200a is accordingly provided with a way of shutting off electricity by use of the solenoid switch 208 to move the shut-off member 208a. The member 208a provides electrical communication between the receptacle 210 and plug 211, ordinarily. However, upon activation of the solenoid switch 208, the shut-off member 208a can interrupt communication there between to shut off the electricity.

The solenoid switch 208 can be activated by a remote signal by remote controller illustrated schematically by reference number 207. In addition, electric interface device 200a has an external power connection 212 for providing power external of the interface device. The external power can be stepped down to a low voltage in the interface device for safety reasons.

FIG. 31 illustrates the arrangement of FIG. 30 in the assembled state, with one change. In this variation, however, both the external power and the remote control connection 207 are illustrated as at the same location 207a.

Electric interface device 200a of FIGS. 29–31 not only provides a shut-off device interfacing with an electric meter box that can be remotely activated, but also provides power to operate a system as described with respect to FIG. 5. This device provides an easy way of providing a shut-off device for electricity, reducing labor costs.

We claim:

1. A utility supply control system for a point of use comprising:
   a gas supply shutoff valve operable to shut off gas supply to the point of use in response to a valve shutoff signal;
   an automatic meter reading device operable to automatically determine gas usage with a gas meter;
   a control operably interconnected with said gas supply shutoff valve and said automatic meter reading device to send the valve shutoff signal to said gas supply shutoff valve and to receive gas usage information from said automatic meter reading device; and
   a fuel cell mounted in gas plumbing of the point of use and operable to generate electrical power from gas in the gas plumbing, said fuel cell being connected with at least one of said gas supply shutoff valve, said automatic meter reading device and said control to supply the electrical power thereto.

2. A utility supply control system for a point of use comprising:
   a gas supply shutoff valve operable to shut off gas supply to the point of use in response to a valve shutoff signal;
   an automatic meter reading device operable to automatically determine gas usage with a gas meter; and
   a control operably interconnected with said gas supply shutoff valve and said automatic meter reading device to send the valve shutoff signal to said gas supply shutoff valve and to receive gas usage information from said automatic meter reading device;
   wherein said control comprises a seismic sensor and is operable to compare a gas flow rate per unit of time before said seismic sensor detects an earthquake to a gas flow rate per unit of time after said seismic sensor has detected the earthquake and to send the valve shutoff signal to said gas supply shutoff valve if the flow rate has increased after the earthquake;
   wherein said control has information of gas flow rates of appliances of the point of use and sends the valve shutoff signal to said gas supply shutoff valve after the earthquake only if the increase in the flow rate does not correspond to the gas flow rates of appliances of the point of use.

3. A utility supply control system for a point of use comprising:
   gas supply shutoff valve operable to shut off gas supply to the point of use in response to a valve shutoff signal;
   an automatic meter reading device operable to automatically determine gas usage with a gas meter;
   a control operably interconnected with said gas supply shutoff valve and said automatic meter reading device to send the valve shutoff signal to said gas supply shutoff valve and to receive gas usage information from said automatic meter reading device; and
   a pressure sensor incorporated with said gas supply shutoff valve and in communication with said control, wherein said pressure sensor is operable to shut off said gas supply shutoff valve upon detection of an abnormal gas pressure.

4. A utility supply control system for a point of use comprising:
   a gas supply shutoff valve operable to shut off gas supply to the point of use in response to a valve shutoff signal;
   an automatic meter reading device operable to automatically determine gas usage with a gas meter;
   a control operably interconnected with said gas supply shutoff valve and said automatic meter reading device to send the valve shutoff signal to said gas supply shutoff valve, send an electricity shut off signal and to receive gas usage information from said automatic meter reading device; and
   an electric interface device operable to shut off electricity to the point of use in response to the electricity shut off signal.

5. The system of claim 4, wherein said electric interface device is operable to be installed at an electric meter box of the point of use.

6. The system of claim 4, wherein said electric interface device is interconnected with each of said gas supply shutoff valve, said automatic meter reading device and said control to supply power thereto.

7. The system of claim 4, wherein said electric interface device is operable to interface between an electric meter and an electric meter box of the point of use.

* * * * *